US 8,532,348 B2

(12) United States Patent
Hunt et al.

(10) Patent No.: US 8,532,348 B2
(45) Date of Patent: Sep. 10, 2013

(54) ITERATIVE PROCESSING

(75) Inventors: Brandon T. Hunt, Seattle, WA (US);
Ernst S. Henle, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 891 days.

(21) Appl. No.: 12/605,280

(22) Filed: Oct. 23, 2009

(65) Prior Publication Data

US 2010/0104153 A1      Apr. 29, 2010

Related U.S. Application Data

(60) Provisional application No. 61/107,988, filed on Oct. 23, 2008.

(51) Int. Cl.
*G06K 9/00*          (2006.01)
(52) U.S. Cl.
USPC .......................... 382/128; 382/173; 382/199
(58) Field of Classification Search
USPC .......................................... 382/128, 173, 199
See application file for complete search history.

(56) References Cited

U.S. PATENT DOCUMENTS

| 6,165,734 | A | 12/2000 | Garini et al. | |
|---|---|---|---|---|
| 6,181,811 | B1 | 1/2001 | Kuan et al. | |
| 6,721,450 | B2 * | 4/2004 | Tannenbaum et al. | 382/173 |
| 8,116,551 | B2 | 2/2012 | Gallagher et al. | |
| 2004/0108452 | A1 | 6/2004 | Graber et al. | |
| 2004/0156854 | A1 | 8/2004 | Mulligan et al. | |
| 2007/0211928 | A1 * | 9/2007 | Weng et al. | 382/128 |
| 2010/0106426 | A1 | 4/2010 | Hunt et al. | |
| 2010/0106460 | A1 | 4/2010 | Hunt et al. | |

FOREIGN PATENT DOCUMENTS

| EP | 1 577 823 A1 | 9/2005 |
|---|---|---|
| GB | 2 403 342 A | 12/2004 |
| WO | WO 01/33573 A1 | 5/2001 |
| WO | WO 01/45046 A1 | 6/2001 |
| WO | WO 2007/059117 A2 | 5/2007 |

OTHER PUBLICATIONS

European Search Report dated Apr. 7, 2010, for related Application Serial No. EP 09 17 3924.3, 9 pages.
Reichenbach, et al., Image background removal in comprehensive two-dimensional gas chromatography Journal of Chromatography A, 985:47-56 (2003).
European Search Report dated Apr. 12, 2010, for Application Serial No. EP 09 17 3923.5, 10 pages.
Neubert et al., Label-free detection of differential protein expression by LC/MALDI Mass Spectrometry, Journal of Proteome Research, 7:2270-2279 (2008).

* cited by examiner

*Primary Examiner* — Luke Gilligan
(74) *Attorney, Agent, or Firm* — Klarquist Sparkman, LLP

(57) ABSTRACT

A regional redefiner redefines a bounding area in sets of chromatographic/mass spectroscopic images. The redefiner defines and localizes peaks in the images which point to a common feature of interest. A redefined bounding area locates other peaks associated with the feature of interest. Peaks can be iteratively identified and extracted using constituent images or a composite image formed as a combination of a set of constituent images.

20 Claims, 31 Drawing Sheets

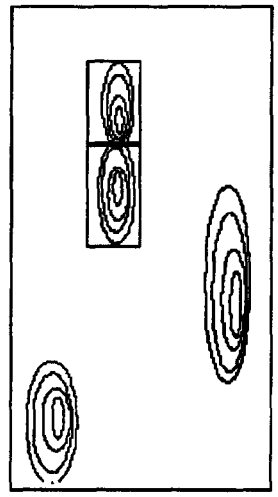
*Fig.4B.*
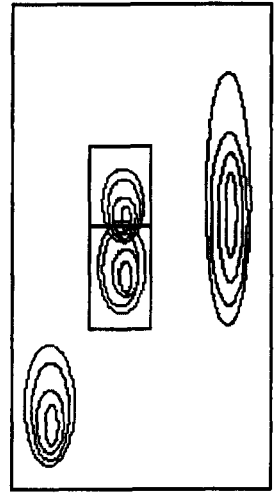
*Fig.4D.*
*Fig.4A.*
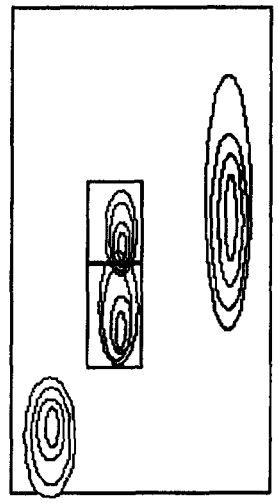
*Fig.4C.*

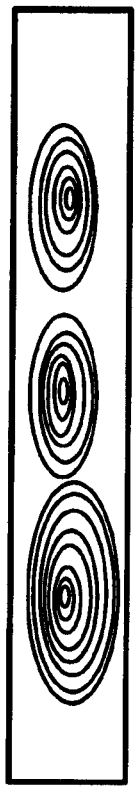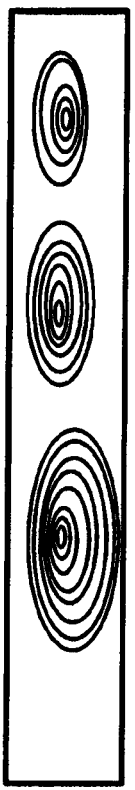

*Fig.5O.* *Fig.5P.* *Fig.5Q.* *Fig.5R.* *Fig.5S.*

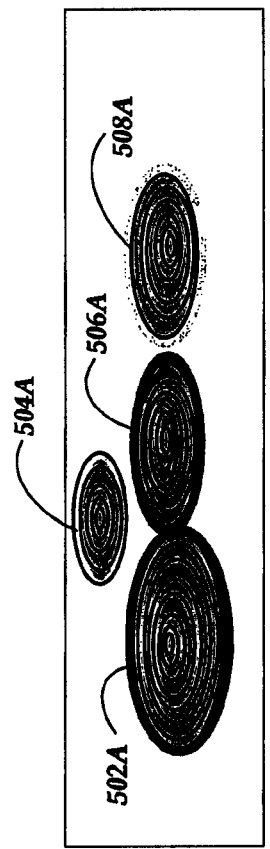
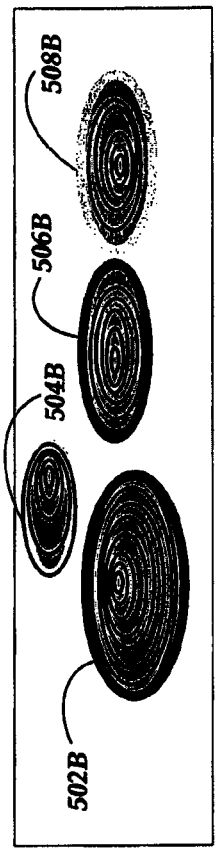
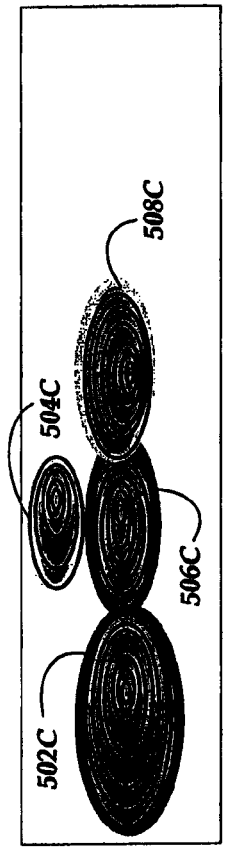
*Fig.5T.* *Fig.5U.* *Fig.5V.*

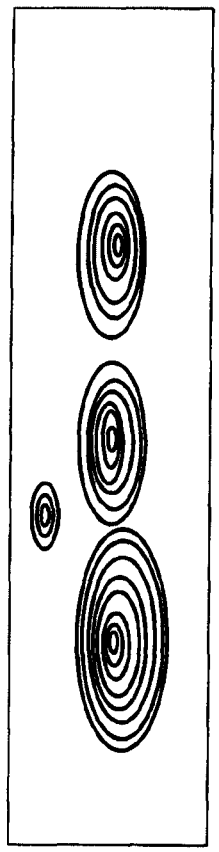
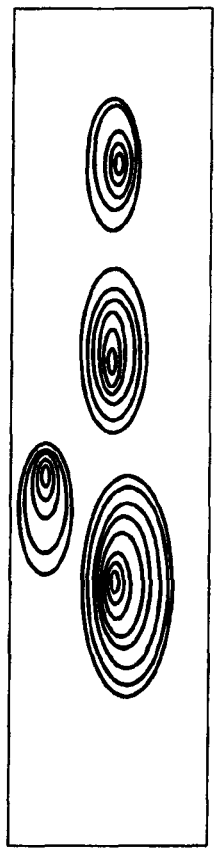
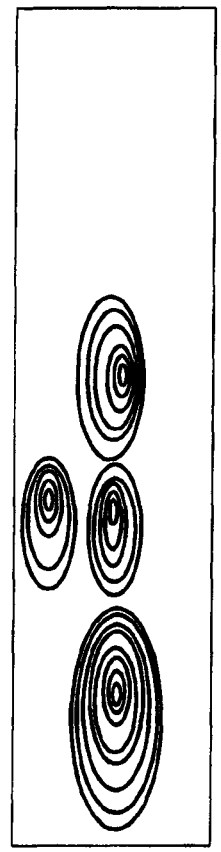
*Fig. 6A.*  *Fig. 6B.*  *Fig. 6C.*

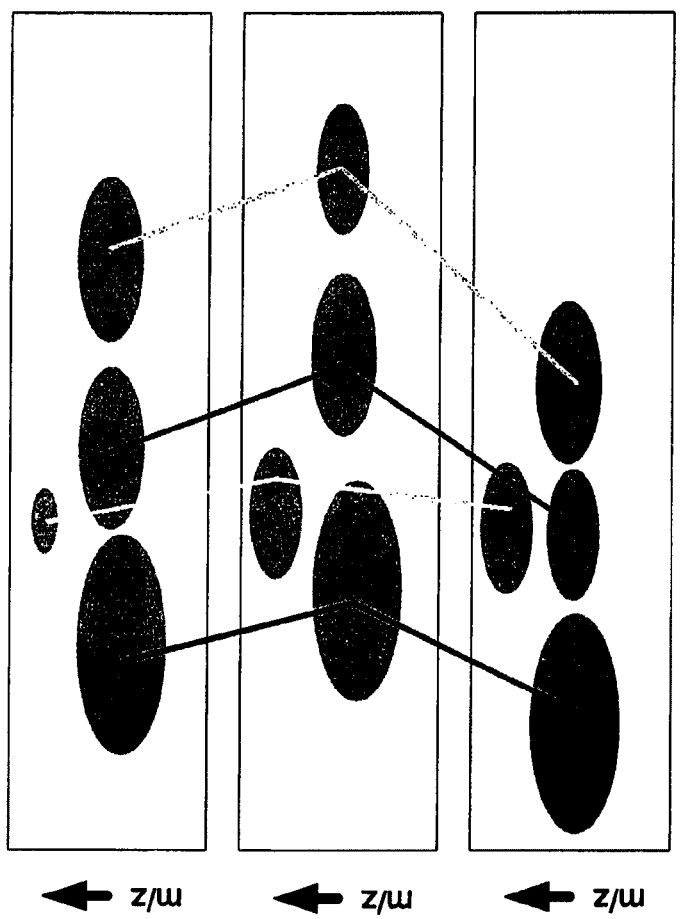

ITERATIVE PROCESSING

CROSS REFERENCE TO RELATED APPLICATION

This application claims the benefit of U.S. Provisional Application No. 61/107,988, filed Oct. 23, 2008, which is incorporated herein by reference.

FIELD

The disclosure pertains to the analysis of chemical and biological specimens.

BACKGROUND

In an experiment, peaks found on images formed from a liquid-chromatography/mass-spectrometry process are evidence that illuminates pharmaceutical discovery. For one image, a bounding area may be defined to localize a peak, which represents a biological clue that is of interest. For the remaining images, there may be many other peaks, all representing potentially different biological clues of interest. However, the same peak must be identified and localized in the remaining images. Furthermore, to reduce the risk of including undesirable artifacts in the peak bounding area, which could lead to erroneous scientific conclusions, the localized bounding areas across all images should be the minimum bounding area required to encompass the peak across all images.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

One aspect of the present subject matter includes an iterative regional processor, which comprises a regional redefiner configured to execute on hardware to alter a bounding area for peaks that point to a species across constituent images so as to facilitate quantitation of the peaks, the bounding area being used to localize peaks across constituent images. As used herein, a peak is a variation in an analysis signal due to a specimen under investigation. In combined liquid chromotagraphy (LC)/mass spectrometry (MS), such peaks are typically associated with an elution time (or time interval) and a mass to charge (m/z) ratio. Examples of peaks include a single peak, a cluster of peaks, or other contiguous signal variations.

Another aspect of the present subject matter includes a method for processing regions of interest to discover biological features, which comprises selecting whether to use a composite image to redefine a region of interest or a set of constituent images to redefine the region of interest without using the composite image. The method further comprises redefining the region of interest to alter a bounding area for peaks that point to a species across constituent images so as to facilitate quantitation of the peaks, the bounding area being used to localize peaks across constituent images.

A further aspect of the present subject matter includes a computer-readable medium having computer-executable instructions stored thereon for implementing a method for processing regions of interest to discover biological features, which comprises selecting whether to use a composite image to redefine a region of interest or a set of constituent images to redefine the region of interest without using the composite image. The method further comprises redefining the region of interest to alter a bounding area for peaks that point to a species across constituent images so as to facilitate quantitation of the peaks, the bounding area being used to localize peaks across constituent images.

The foregoing and other objects, features, and advantages of the invention will become more apparent from the following detailed description, which proceeds with reference to the accompanying figures.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 4A is a pictorial diagram illustrating an exemplary composite snippet that has been segmented.

FIGS. 4B-4D are pictorial diagrams illustrating an exemplary segmentation of the constituent images.

FIGS. 5K-5M are pictorial diagrams illustrating exemplary microaligned snippets of various constituent images.

FIGS. 5N-5O are pictorial diagrams illustrating an exemplary microaligned, composite snippet.

FIG. 5P is a pictorial diagram illustrating exemplary peak masks formed from the exemplary microaligned, composite snippet.

FIG. 5Q is a pictorial diagram illustrating further exemplary snippets cut from the microaligned, composite snippet by using the exemplary peak masks.

FIG. 5R is a pictorial diagram illustrating further segmentation of the exemplary snippets.

FIG. 5S is a pictorial diagram illustrating exemplary peak masks.

FIGS. 5T-5V are pictorial diagrams illustrating exemplary peaks on exemplary snippets of various individual constituent images.

FIGS. 6A-6C are pictorial diagrams illustrating exemplary, constituent images.

FIGS. 6G-6I are pictorial diagrams illustrating identified relationships among the peak masks without the use of a composite image.

DETAILED DESCRIPTION

Figure 1A:
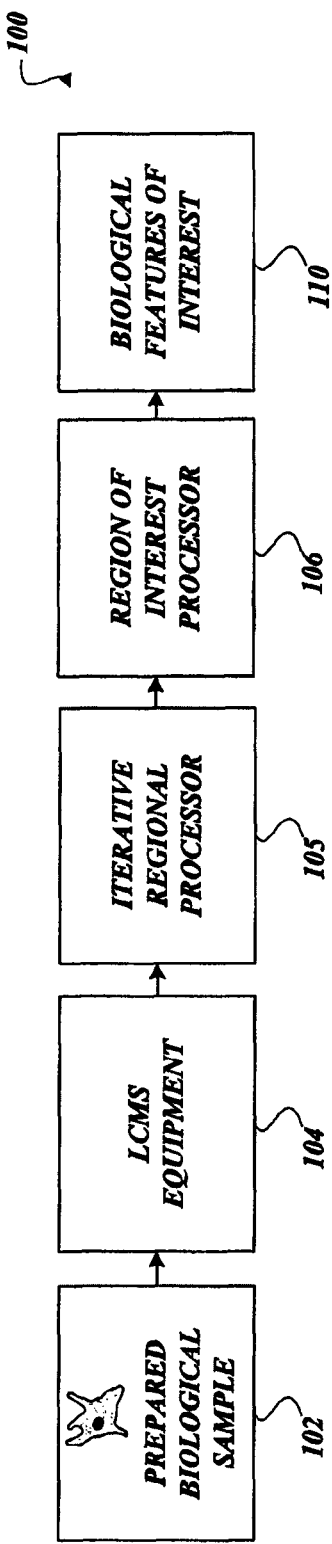
FIG. 1A is a block diagram illustrating exemplary hardware components to process prepared biological samples to produce biological candidate lists to researchers.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

Mass spectrometry can be coupled with other separation techniques such as liquid chromatography, gel electrophoresis, gas chromatography, and ion diffusion. Data obtained by combinations of such techniques can be represented as n-dimensional data sets. For example, a chromatographic retention time and a mass-to-charge ratio of a mass spectrum can be used as coordinates of first and second axes. Signal intensities associated with these coordinates can be represented as a two-dimensional array of data values, and such data can be referred to as images or image data.

Mass spectrometry and liquid chromatography are two important separation techniques that can be applied to the evaluation of biological samples, and LC/MS data sets (referred to herein as images or image data) are used in the following description, but other types of data can be used. Typical biological specimens include mixtures of proteins, carbohydrates, lipids, and metabolites, but other chemical or biological specimens can be similarly investigated, and the disclosed methods and apparatus can be applied to non-biological specimens as well.

Some examples of the disclosed methods and apparatus pertain to pharmaceutical research. Pharmaceutical medical research is often directed to determining biological chemicals that are an indicator of a physiological state, such as a disease state or a response to treatment with a medication. A set of one or more of such chemicals is called a biomarker. Biomarkers may be used to diagnose disease or other physiological states.

Biomarkers can be used in a laboratory as substitutes for clinical endpoints, and such biomarkers are referred to as surrogate endpoints. Surrogate endpoints may be used to develop medicines without involving human or even animal subjects. Drug development may begin by testing for a surrogate endpoint in a test tube.

A common scenario is to process a biological specimen such as a biopsy specimen, blood, saliva, amniotic fluid, etc such that the complex chemical mixture associated with the specimen can be introduced into liquid chromatography/mass spectrometry instruments. The resulting data (signal intensity as a function of retention time and m/z ratio) is then used to identify the biochemicals in this complex mixture. The disclosed methods and apparatus permit identification of the more biologically relevant data by selecting only portions of the data. Specifically, the methods and apparatus permit identification of a signal of interest of one or more chemicals from the LC/MS data set, increased signal to noise ratio, typically by isolating or extracting the portion of the signal of interest from noise or other extraneous signals that can contaminate the signal of interest. Signal portions associated with one or more moieties can be removed or partially removed to permit investigation of additional signal features. For example, peaks associated with a particular moiety can be removed so that other peaks can be more clearly revealed.

Processing analytical data as disclosed provides superior isolation and identification and better quantification of chemicals in a complex mixture. A researcher can repeat this analysis process for healthy and diseased subjects and/or for untreated and treated subjects. Based on differences in chemicals constituents between a healthy and a diseased subject or between a treated and treated subject identified in this manner, a biomarker can be defined. In some cases, this biomarker can serve as a surrogate endpoint for use a substitute for a clinical endpoint. Such biomarkers may be used as diagnostic and treatment indicators in drug development.

Representative embodiments are described herein with respect to images based on liquid chromatography (LC) and mass spectrometry (MS). Typically, signal intensity is recorded as a function of LC retention time and MS mass-to-charge ratio (m/z), and this recorded signal intensity can be stored or processed as an image data array. For convenience herein, retention time is generally arranged along a horizontal (x-axis) and m/z is arranged along a vertical (y-axis). In other examples, other types of data are used instead of or in addition to LC retention time or m/z ratio. For example, gas chromatography (GC), ion spectroscopy, gel electrophoresis, ion diffusion, or mass spectroscopy time-of-flight data can be used.

In the following examples, analytical results associated with evaluation of biological samples are captured as digital images called replicates. Intensity variations are littered throughout the replicates. As noted above, conventional evaluation techniques are unable to identify corresponding relationships between various intensity variations among the replicates. While so-called "time warping" can be used to align these intensity variations to better identify those variations that are noise and reveal those intensity variations that are not noise, aligning some intensity variations results in the misalignment of other intensity variations, some of which might be important features.

FIG. 1A illustrates a system 100 for processing biological samples so as to detect biological features. In a scientific experiment, each biological sample undergoes the same experiment (treatment condition) or different experiments (treatment conditions), which result in prepared biological samples 102, and such prepared biological samples 102 are further processed by, for example, LC/MS equipment 104, which applies various liquid chromatography and mass spectrometry processing. The results are one or more LC/MS images or constituent images that are further processed by an iterative regional processor 105, which includes hardware and/or software executing on one or more computing devices. The processed regions provided by the iterative regional processor 105 are further processed by a region of interest processor 106, which includes hardware and/or software executing on one or more computing devices. Various scores based on geometry and correlation allow the system 100 to classify biological features extracted from the prepared biological samples 102 to identify one or more biological features of interest 110.

Figure 1B:
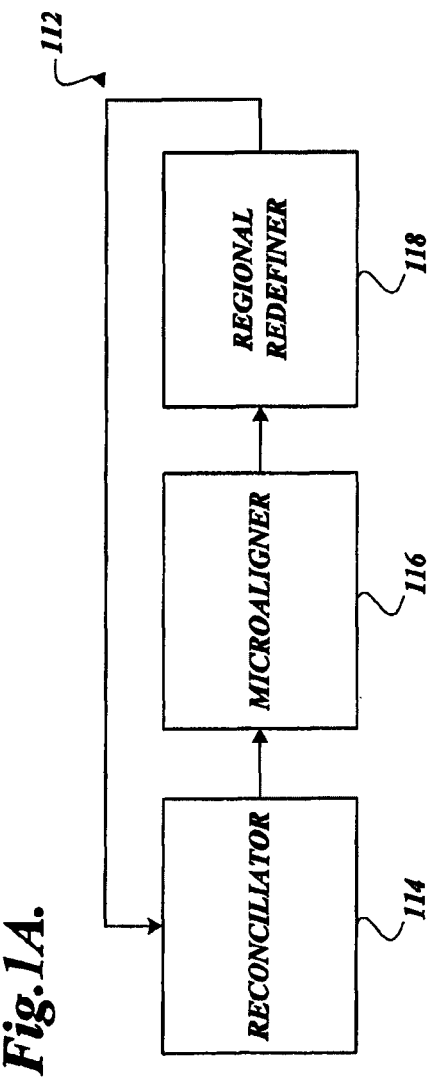
FIG. 1B is a block diagram illustrating exemplary hardware components to execute a iterative regional redefinition process.

FIG. 1B illustrates a portion 112 among many portions of the iterative regional processor 105 in greater detail. The portion 112 helps to refine peak detection in composite images, in one embodiment, and without the use of composite images, in another embodiment. The portion 112 identifies a region of interest, such as a peak, and uses information from multiple images to redefine a bounding area of a peak to encompass a suitably reproducible area of the peak across multiple images. Each image in the collection of images may be referenced as an LC/MS (liquid chromatography/mass spectrometry) image or a replicate or a constituent image or an LC/MS run. A peak is suitably expressed on one or more images. However, the bounding area may differ on each image to capture the peak. Each of these bounding areas may be different in size and location. Some of the bounding areas contain artifacts that may have been erroneously incorporated into the bounding area due to, for example, inadequate segmentation techniques. On some constituents, the bounding areas may be missing altogether. To facilitate better comparisons among boundary areas from different images, the bounding areas should suitably be made similar in size across different images. This localizes a pertinent region of interest to an exemplary boundary area that can be used to supplant different boundary areas for images. This exemplary boundary area represents a tool to illuminate desired peaks of various images.

The portion of the iterative regional processor 110 includes a reconciliator 114. The reconciliator 114 identifies an eluted species over multiple constituent images. In other words, one or more constituent images may contain the eluted species of interest, and also many differently eluted species, often within very close proximity to the eluted species of interest. The difficulty is to associate one peak on one constituent image with other peaks on other constituent images, which represent the exactly same eluted species. The reconciliator 114 assists with this identification. One suitable implementation, as would be appreciated by one of ordinary skill in the art, is the use of peak reassembly techniques. Such techniques allow correlation of peaks from multiple images that typically cannot be superimposed by macroalignment. Other suitable techniques are possible. These constituent images can be used to produce a composite image, in one embodiment, by a suitable technique, such as averaging or maximal projection of the constituent images to form the composite image. Variations, such as shapes and intensities of spots on the composite image determine feature boundaries. Spots are intensity peaks that constitute a contiguous area in the constituent image. Multiplexed constituent images form a composite image. In such an image, peaks from constituent images may overlap or be in close proximity to peaks in other constituent images. Peaks that correspond to each other in this manner are presumed to result from the same chemical. Corresponding peaks from different constituent images overlap or are in close proximity on the composite image, due to variation in elution time, even after a possible macro-alignment. In another embodiment, analysis is made using the constituent images without the composite image.

The portion 112 includes a microaligner 116. The microaligner 116 aligns in the retention time dimension to overcome an uncertainty or inadequate calibration associated with a liquid chromatography process. In one embodiment, the microaligner 116 aligns pixels of one region of interest with pixels from the same virtual region of interest on other constituent images, in the retention time dimension. Other parts of the constituent image and other regions of interest on the constituent image are not considered and are not affected even if these parts of regions of interest have the same retention time. This focus on a single region of interest at a time allows alignment that is not possible with conventional time warping.

The microaligner 116 aligns regions of interest in the constituent images whose boundaries are derived from a previously detected region of interest. The detection may have occurred using the composite image, in one embodiment, but in another embodiment, the composite image need not be used. Microalignment of regions of interest in the constituent images may aid in correlation of peaks and regional scoring, which reveals clues such as biological features or a lack thereof. Redefining the boundaries of regions of interest after microalignment, such as by the portion 112, may help reduce, remove or minimize noise in the region of interest by tightening the region of interest, thereby excluding noise that was part of the original region of interest.

The microaligner 116 may refine alignment of regions of interest even in the absence of a composite image. In this instance, regions of interest on various constituent images are correlated and presumed to have originated from the same chemical species if their macroaligned bounded areas overlap or are in close proximity to each other. Such regions of interest correspond to each other on these constituent images. The microaligner 116 then aligns a set of corresponding regions of interest. One use of a composite image in microalignment is to associate regions of interest from multiple constituent images. In this use, the composite image identifies a common region of interest, which can be applied to all constituents considering their differences in retention time. If sets of corresponding regions of interest can be identified without a composite image, then those sets of corresponding regions of interest can be microaligned.

The iterative regional processor 106 includes a regional redefiner 118. Because of varying boundaries to capture regions of interest in various constituent images, these regions of interest may include artifacts that are not of interest. Such artifacts are noise, such as surrounding background and neighboring contaminates, to be contrasted with a signal that includes pixels of interest. By creating a composite snippet, the original region of interest can be redefined such that it is more likely to include more of pixels of interest and fewer pixels not of interest, such as noise. With less noise, the signal becomes better identified and enables better scoring to reveal biological clues leading to scientific discovery. The regional redefiner 118 alters bounding areas for peaks across constituent images, all pointing to the same clue to a biological feature of interest. The result is a common bounding area which helps to facilitate quantitation of peaks by improving statistical models for evaluating and comparing peaks.

Figure 2A:
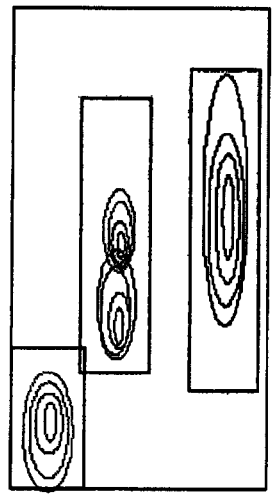
FIGS. 2A-2C are pictorial diagrams illustrating exemplary LC/MS images (constituent images).
Figure 2C:
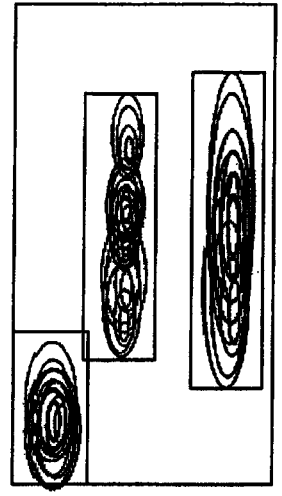
Figure 2B:
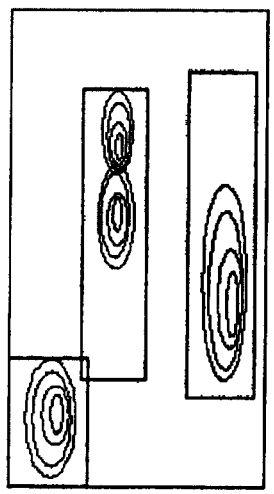
Figure 2D:
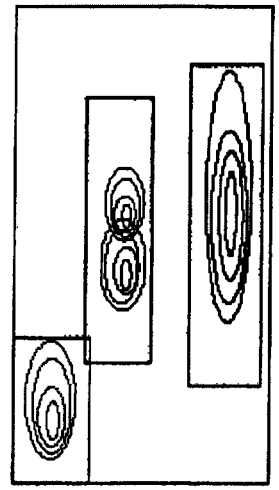
FIG. 2D is a pictorial diagram illustrating an exemplary composite image.

FIG. 2D illustrates a composite image formed from constituent images illustrated by FIGS. 2A-2C. There are various suitable techniques for combining constituent images to form the composite image, such as averaging or maximal projection. Suitably, an averaging is used to enhance the signal-to-noise ratio. A segmentation process is applied to provide granular areas that are likely to contain peaks. Peaks shown in the figures are represented as series of nested ellipses. Inner ellipses indicate increased signal intensity and thus the elliptical representation is similar to topographic map. An intensity maximum is situated within the smallest ellipse. Ellipse spacing corresponds to constant signal intensity steps. Next, a suitable association process, such as peak reassembly, is executed to yield entities localized by bounding areas that are likely to reflect individual species. These bounding areas are represented as rectangular boxes in FIG. 2D, but bounding areas can be elliptical, circular, square, oval, polygonal, or other regular or irregular contiguous shapes. Referring to FIGS. 2A-2C, the bounding areas can be projected onto the constituent images and the information that is bounded by corresponding bounding areas is considered reconciled in the sense that a peak that is bounded by one bounding area in one constituent image is considered to be associated with another peak that is bounded by the same bounding area in another constituent image.

Figure 3B:
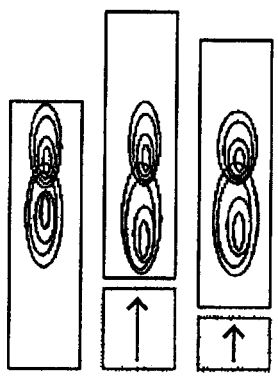
FIGS. 3A-3B are pictorial diagrams illustrating snippets of constituent images and exemplary microaligned snippets.
Figure 3C:
FIG. 3C is a pictorial diagram illustrating an exemplary composite snippet.
Figure 3A:
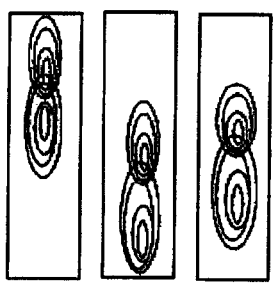

FIG. 3A illustrates snippets of the constituent images found in FIGS. 2A-2C. As can be appreciated, these snippets are not microaligned. The peaks in these figures are visually represented as series of ellipses as described above. The peaks in the upper snippet are flushed to the right. The peaks in the middle snippet are flushed to the left, and the peaks in the lower snippet tend toward the left. To begin the microalignment process, a bounding area of the same size is applied to these snippets. See FIG. 3A. Next, a master snippet is chosen (in this example, the upper snippet) to which other snippets (the middle snippet and the lower snippet) will be microaligned. FIG. 3B illustrates that the middle snippet and the lower snippet have been shifted to the left. Two arrows with varying lengths indicate the extent to which shifting has occurred to achieve microalignment with the master snippet (the upper snippet). FIG. 3C illustrates a composite snippet formed from the microaligned snippets illustrated by FIG. 3B.

FIG. 4A illustrates the composite snippet formed from the microaligned snippets, which has undergone image segmentation to identify two peaks that are adjacent to each other. The segmentation process reveals adjacent bounding areas that redefine a region of interest. The bounding areas are represented as rectangular boxes, but other shapes can be used. FIGS. 4B-4D illustrate the application of the bounding areas identified from the microaligned, composited, segmented image to the constituent images. This application redefines the boundaries of the peaks of interest.

Figure 5A:
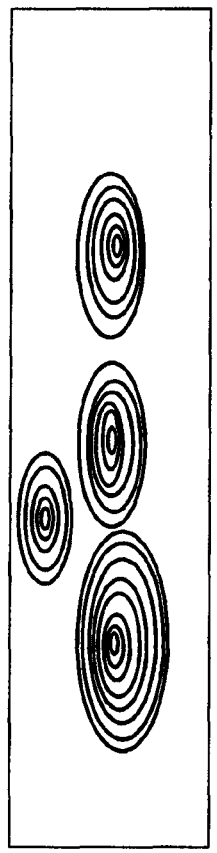
FIGS. 5A-5C are pictorial diagrams illustrating exemplary constituent images.
Figure 5B:
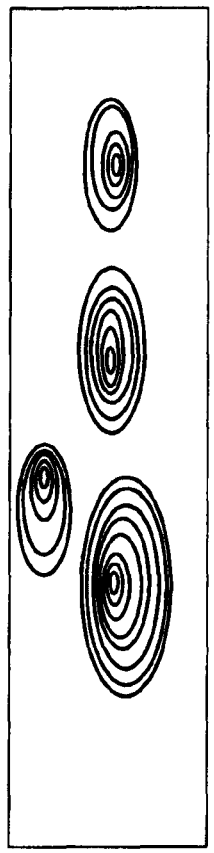
Figure 5C:
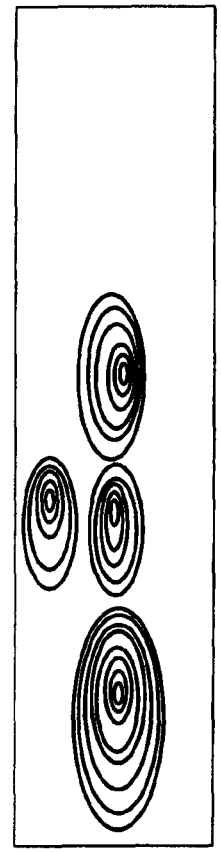

FIGS. 5A-5C illustrate peaks across constituent images. These peaks are not associated with each other. Thus, no conclusion can be made as to whether some of them point to the same clue to illuminate biological features of interest. The peaks are visually represented as ellipses that contain other ellipses. Each inner ellipse visually illustrates an increased intensity like a topographic map so that the smallest ellipse contained by other larger ellipses contains an apex of intensity maximum. It can be assumed that the constituent images of FIGS. 5A-5C have been macroaligned, which macroalignment appears to be imperfect because residual localized misalignment remains.

Figure 5D:
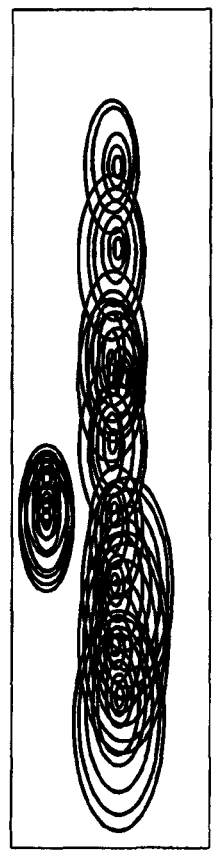
FIG. 5D is a pictorial diagram illustrating an exemplary composite image.
Figure 5E:
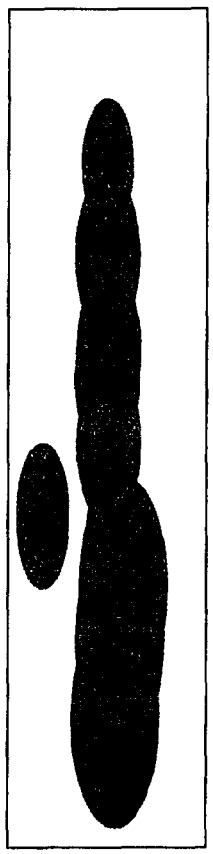
FIG. 5E is a pictorial diagram illustrating exemplary peak masks derived from the composite image.
Figure 5F:
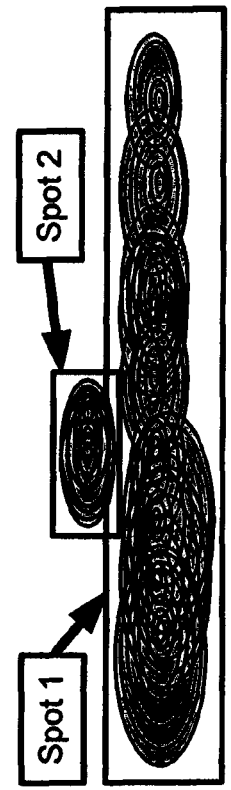
FIG. 5F is a pictorial diagram illustrating identification of exemplary peaks using the peak masks previously formed.
Figure 5G:
FIG. 5G is a pictorial diagram illustrating an exemplary snippet of the composite image identified by an exemplary peak mask.

FIG. 5D illustrates a composite image formed from the multiplexing of constituent images of FIGS. 5A-5C. FIG. 5E illustrates two spots formed from executing a segmentation process on the composite image of FIG. 5D. The two spots (upper mask and lower mask) have bounding areas that identify pieces of information to be further processed by regional redefinition in accordance with various embodiments of the present subject matter. See FIG. 5F. FIG. 5G illustrates a selection of the lower mask, which identifies pieces of information in the composite image that is elongated and is referred to as Spot 1 on FIG. 5F. Using the bounding area of the mask, additional pieces of information are identified by the application of the bounding area of the mask on the constituent images to form snippets. See FIGS. 5H-5J.

The snippets are then microaligned. See FIGS. 5K-5M where the snippets are uneven in their position so as to microalign peaks contained by the snippets. FIG. 5N illustrates a composite snippet formed from the microaligned snippets of FIGS. 5K-5M. FIG. 5O is a representation of the composite snippet to ease the discussion of the following figures. FIG. 5P illustrates a segmentation of the composite snippet to form two masks. FIG. 5Q illustrates the use of the bounding areas of the two masks to differentiate the two regions of interest of the composite snippet. The process above is repeated so that FIG. 5R illustrates the identification of three distinct peaks. FIG. 5S illustrates masks formed from these distinct peaks. The masks are applied to the original constituent images to reveal peaks that are associated with each other, hence illuminating clues to biological features of interest. The masks of FIG. 5S are applied to the three lower peaks in each of FIGS. 5T-5V. The mask for the upper spot is derived from Spot 2 on FIG. 5F. FIGS. 5T-5V have regionally redefined peaks that correspond among the constituents. Corresponding peaks among FIGS. 5T-5V are 502A-502C, 504A-504C, 506A-506C, and 508A-508C.

Figure 6D:
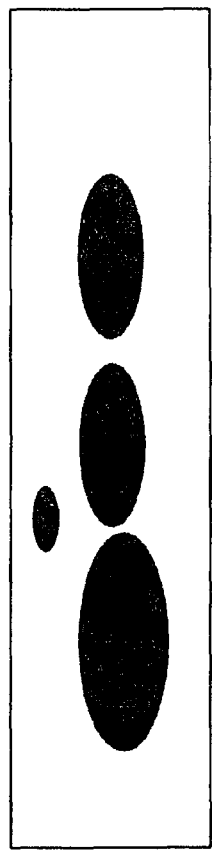
FIGS. 6D-6F are pictorial diagrams illustrating exemplary peak masks.
Figure 6E:
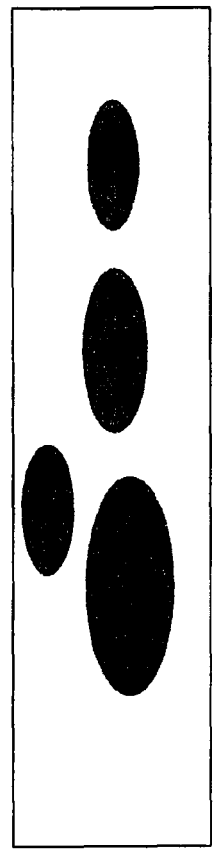
Figure 6F:
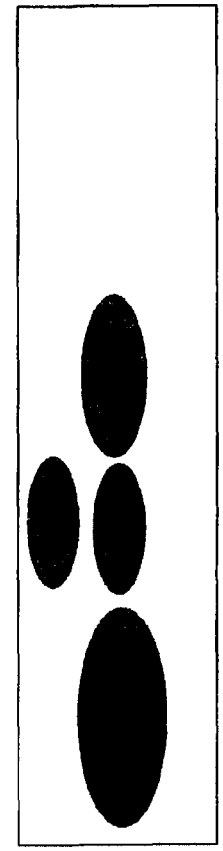

FIGS. 6A-6C illustrate peaks across constituent images. These peaks are not associated with each other. Thus, no conclusion can be made whether some of them point to the same clue to illuminate biological features of interest. The peaks are represented as ellipses that contain other ellipses. Each inner ellipse visually illustrates an increased intensity like topographic maps as described above. FIGS. 6D-6F are masks of spots resulted from a segmentation process, which is executed on the constituent images of FIGS. 6A-6C. FIGS. 6G-6I illustrate the spot masks but those masks that have a relationship with each other are visually tied by a line that crosses among constituent images.

Figure 6J:
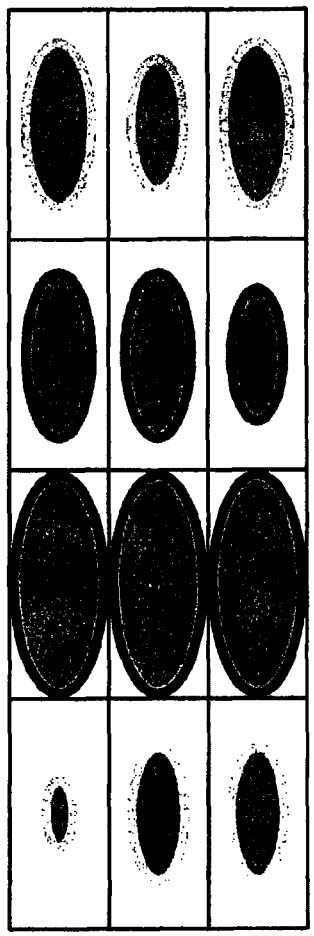
FIG. 6J is a pictorial diagram illustrating a matrix of peak masks.
Figure 6K:
FIG. 6K is a pictorial diagram illustrating selection of consensus peak masks in accordance with one embodiment of the present subject matter.
Figure 6L:
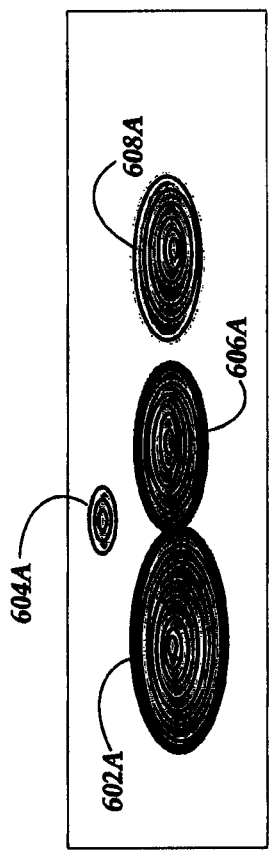
FIGS. 6L-6N are pictorial diagrams illustrating peaks from various constituent images as detected by various peak masks.
Figure 6M:
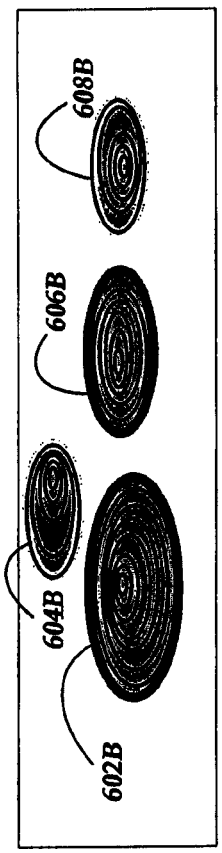
Figure 6N:
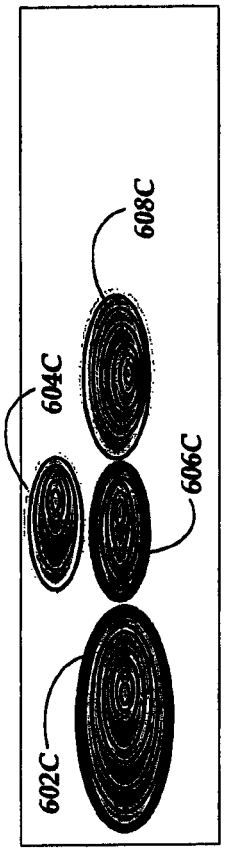
Figure 6O:
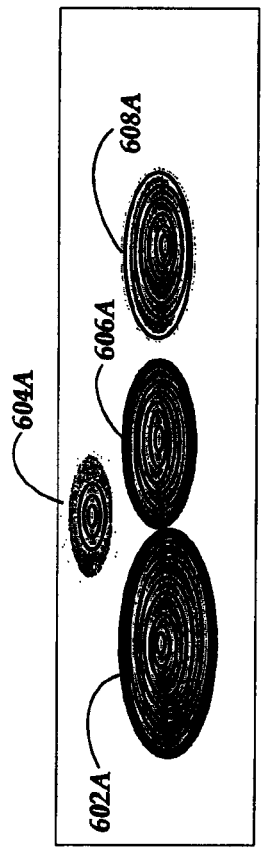
FIGS. 6O-6Q are pictorial diagrams illustrating peaks from various constituent images as detected by various consensus peak masks in accordance with one embodiment of the present subject matter.
Figure 6P:
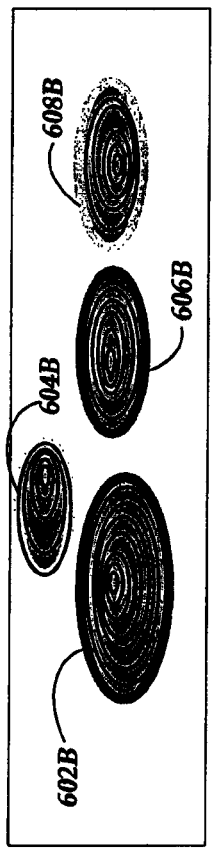
Figure 6Q:
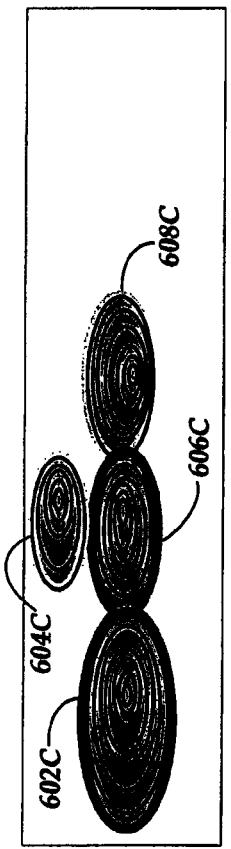

FIG. 6J illustrates a matrix comprising columns and rows. The intersection of each column and each row stores a spot mask. Each column points to spot masks that are related to each other, probably revealing peaks that point to the same biological clue or species. Each row points to spot masks that are on the same constituent image. For example, the first row points to spot masks that come from the first constituent image (FIG. 6A); the second row points to spot masks that come from the second constituent image (FIG. 6B); and the third row points to spot masks that come from the third constituent image (FIG. 6C). FIG. 6K illustrates another matrix that has multiple columns and one row. The one row represents consensus spot masks that are associated with peaks corresponding to different biological clues or chemical species. In one embodiment, the consensus spot masks are the largest of all the spot masks in the columns of the matrix of FIG. 6J. In another embodiment, a union of the spot masks of each column of the matrix of FIG. 6J is the consensus spot mask for that column. In a third embodiment, the consensus spot mask is the largest ellipse that can be fitted into the union of spot masks of the same column of the matrix of FIG. 6J. Related peaks are the peaks 602A-602C, 604A-604C, 606A-606C, and 608A-608C, respectively, as shown in the constituent images of FIGS. 6L-6N. FIGS. 6O-6Q illustrate constituent images with peaks that are related, identified, and bounded in accordance with the consensus spot masks of the matrix of FIG. 6K.

The converged peak masks are placed cookie-cutter fashion onto the constituent images. The location of the placement takes into consideration macroalignment and microalignment. In the example of FIG. 5, FIGS. 5T-5V represent the regionally redefined peak detections that are the result of this process. In the example of FIG. 6, FIGS. 6L-6Q represent the regionally redefined peak detections that are the result of the process in which the intermediate microaligned composite image was not generated.

Figure 7A:
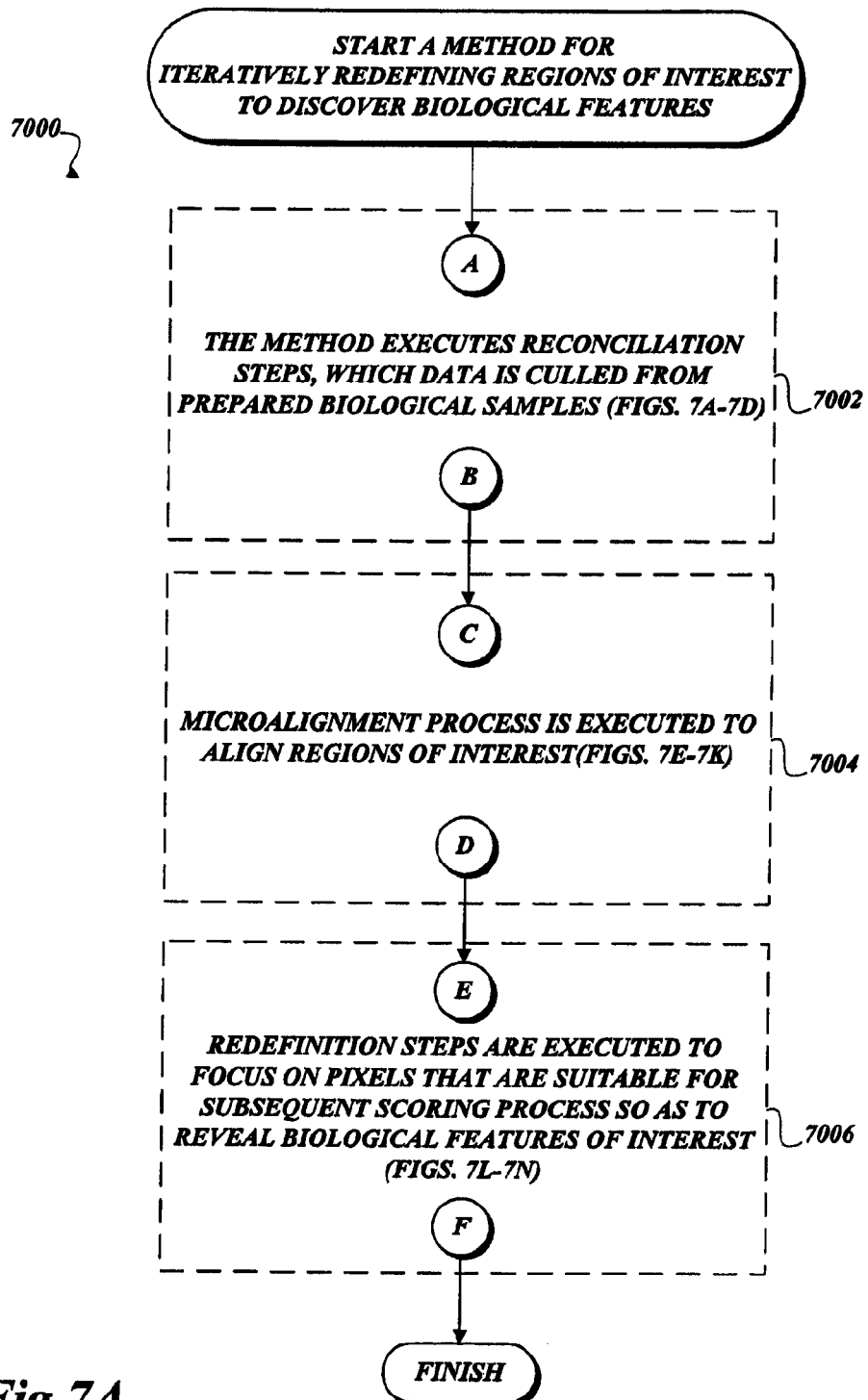
FIGS. 7A-7N are process diagrams illustrating a method for iteratively redefining regions of interest to discover biological features.
Figure 7B:
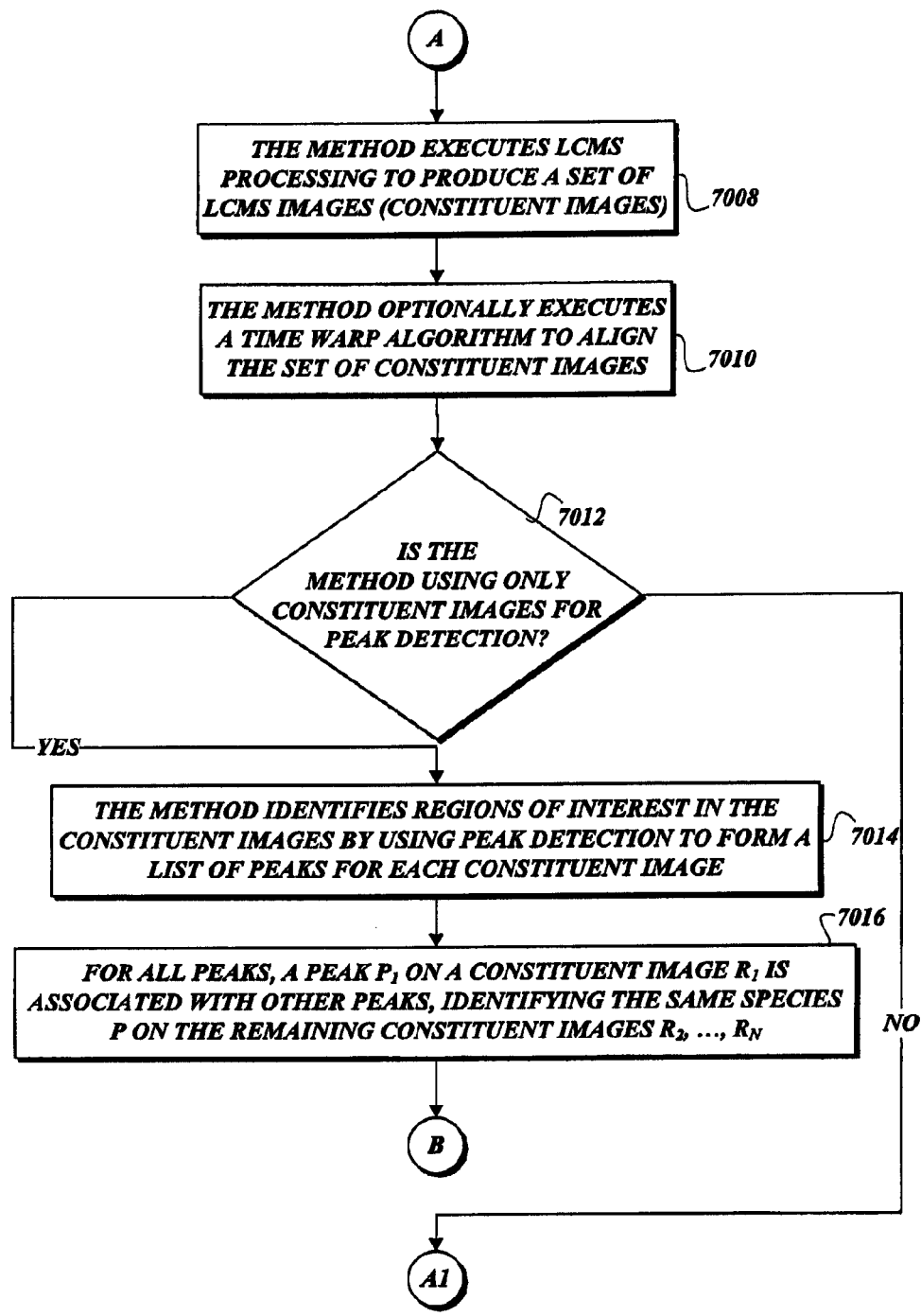
Figure 7C:
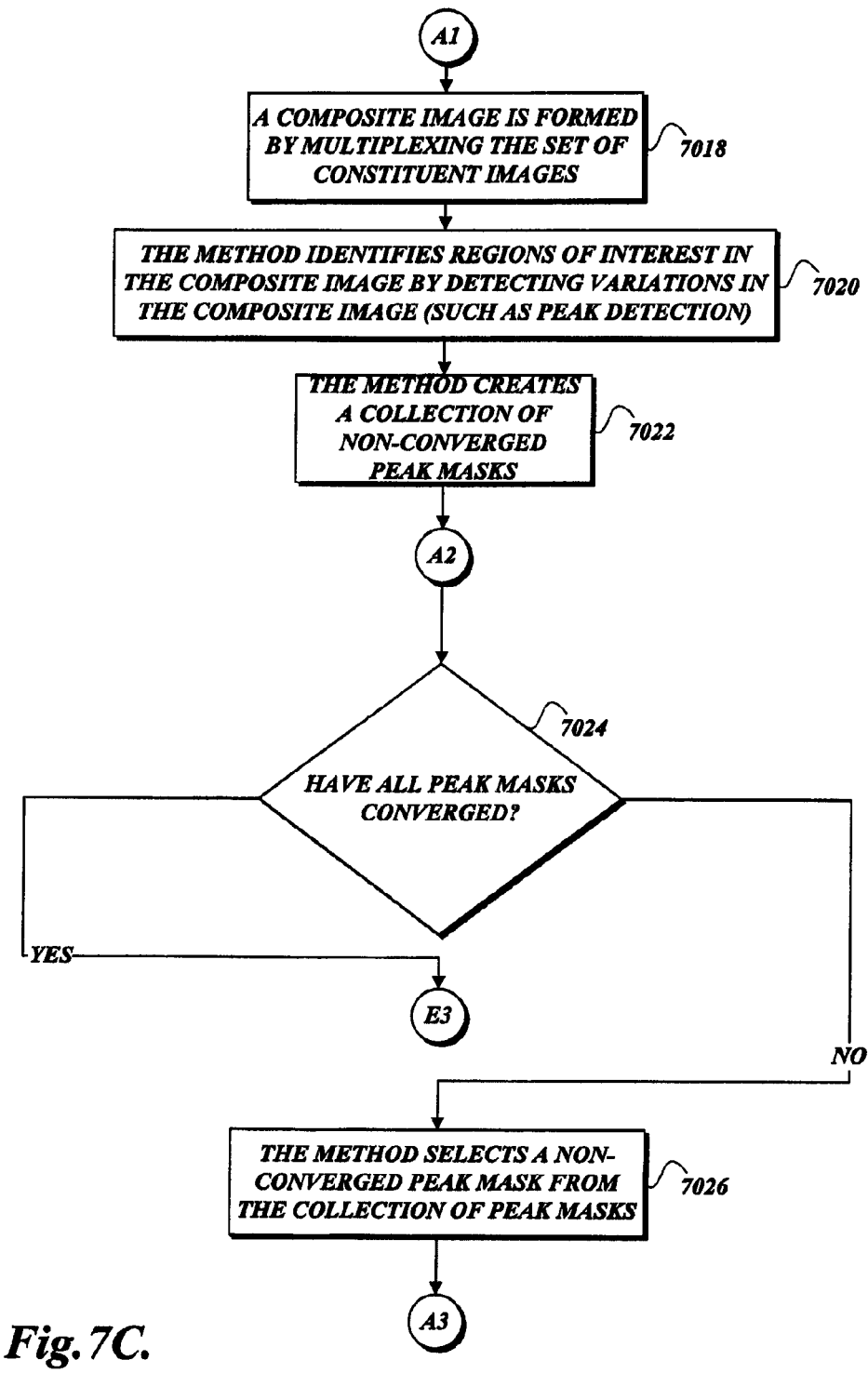
Figure 7D:
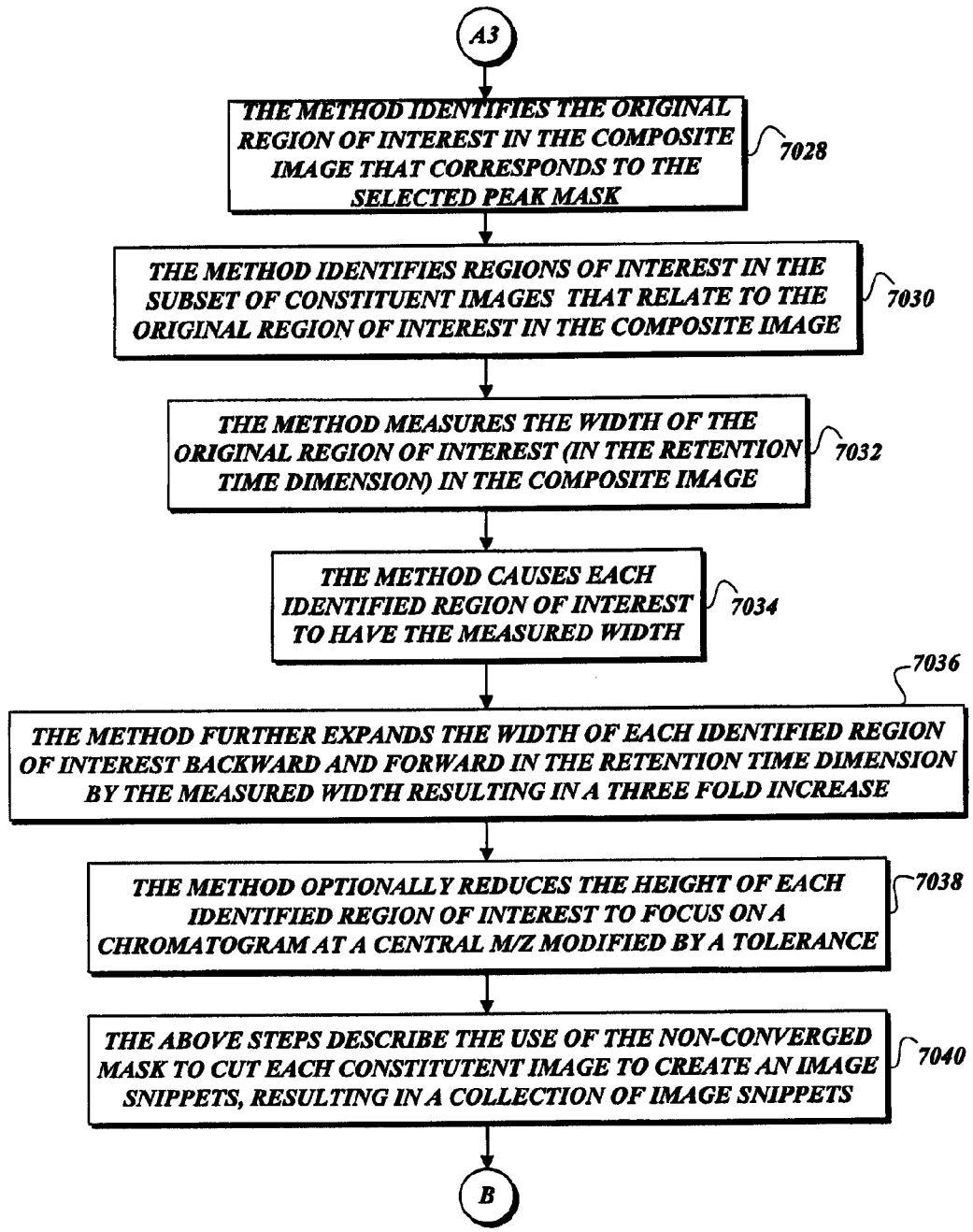
Figure 7E:
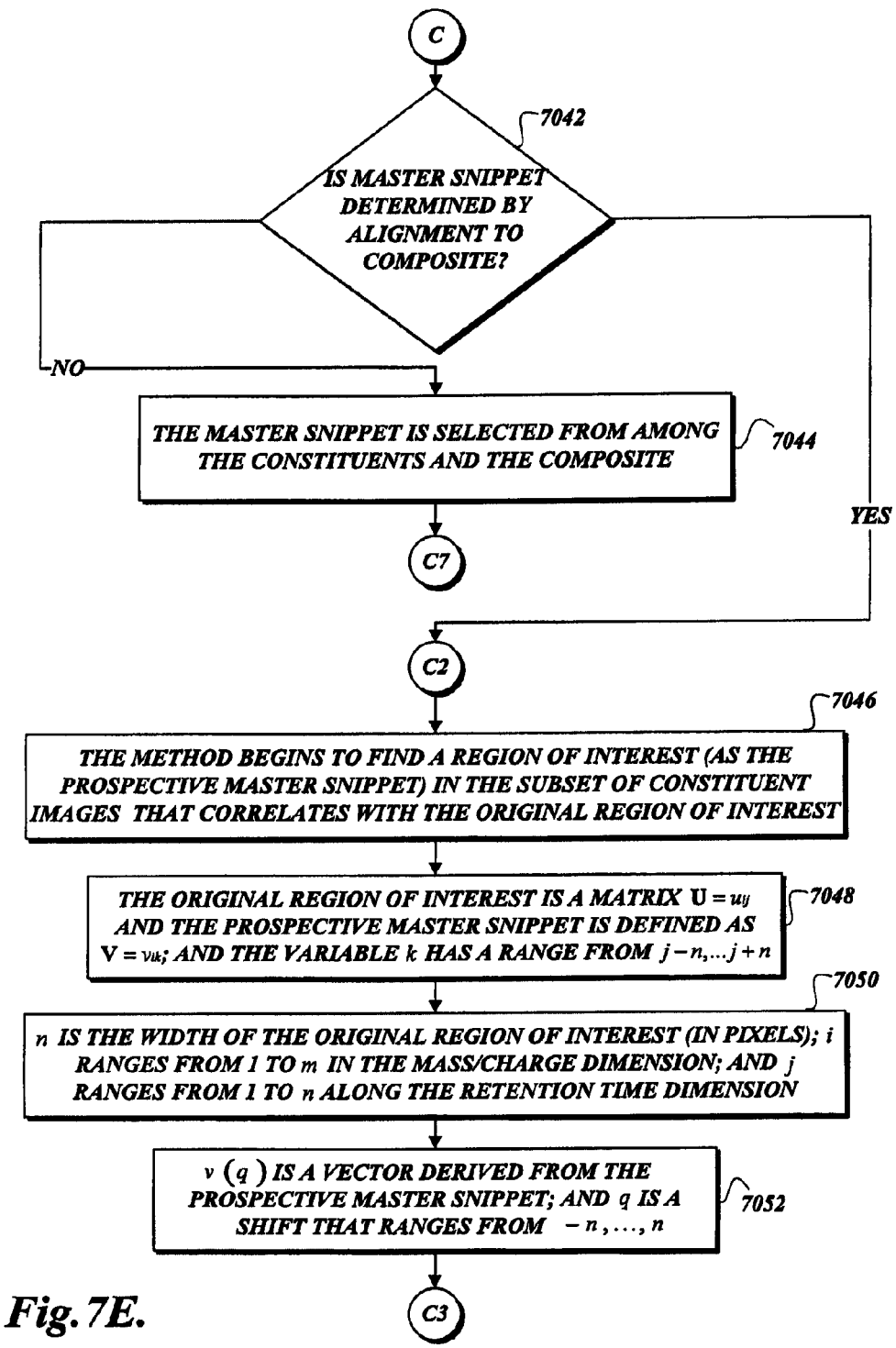
Figure 7F:
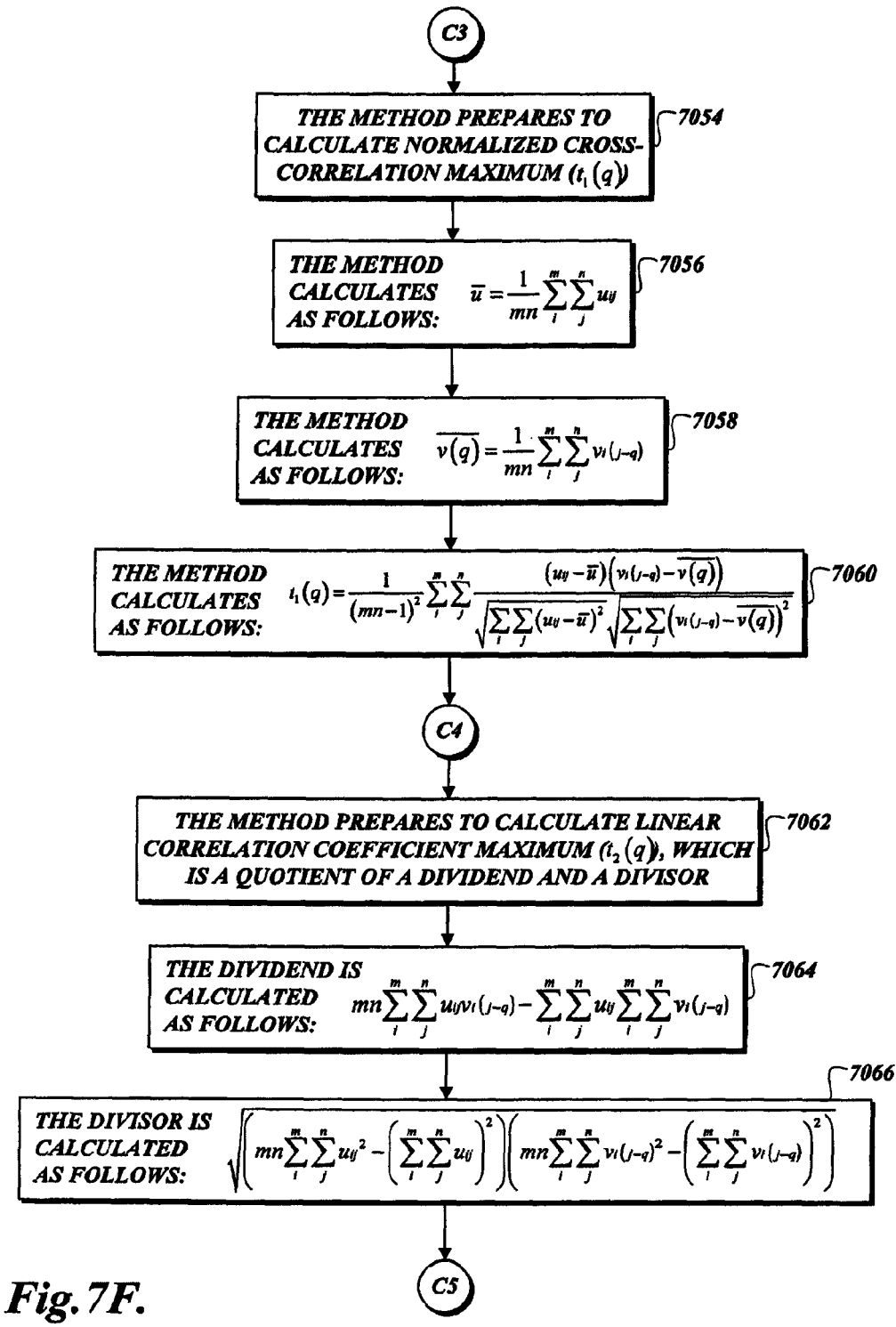
Figure 7G:
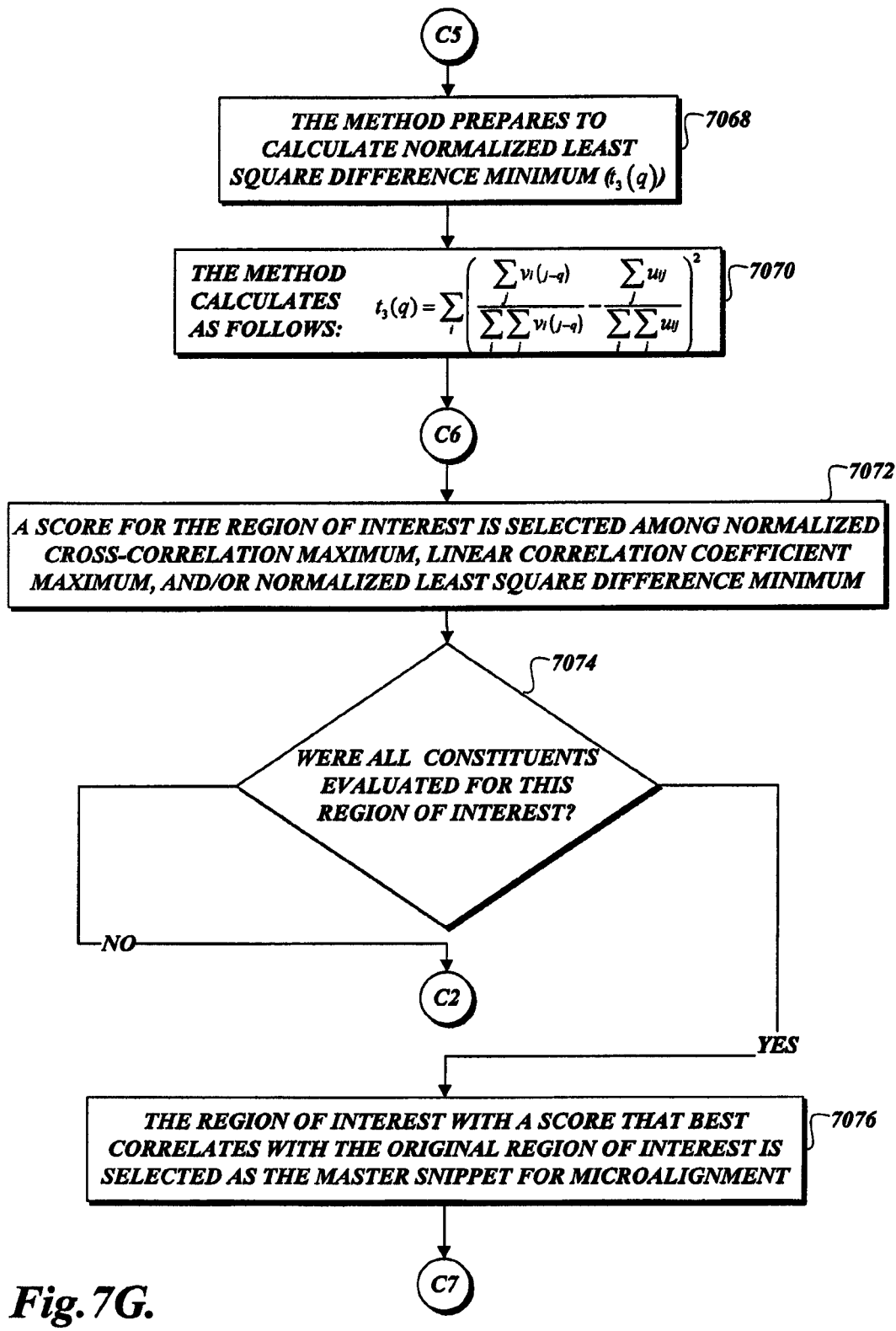
Figure 7H:
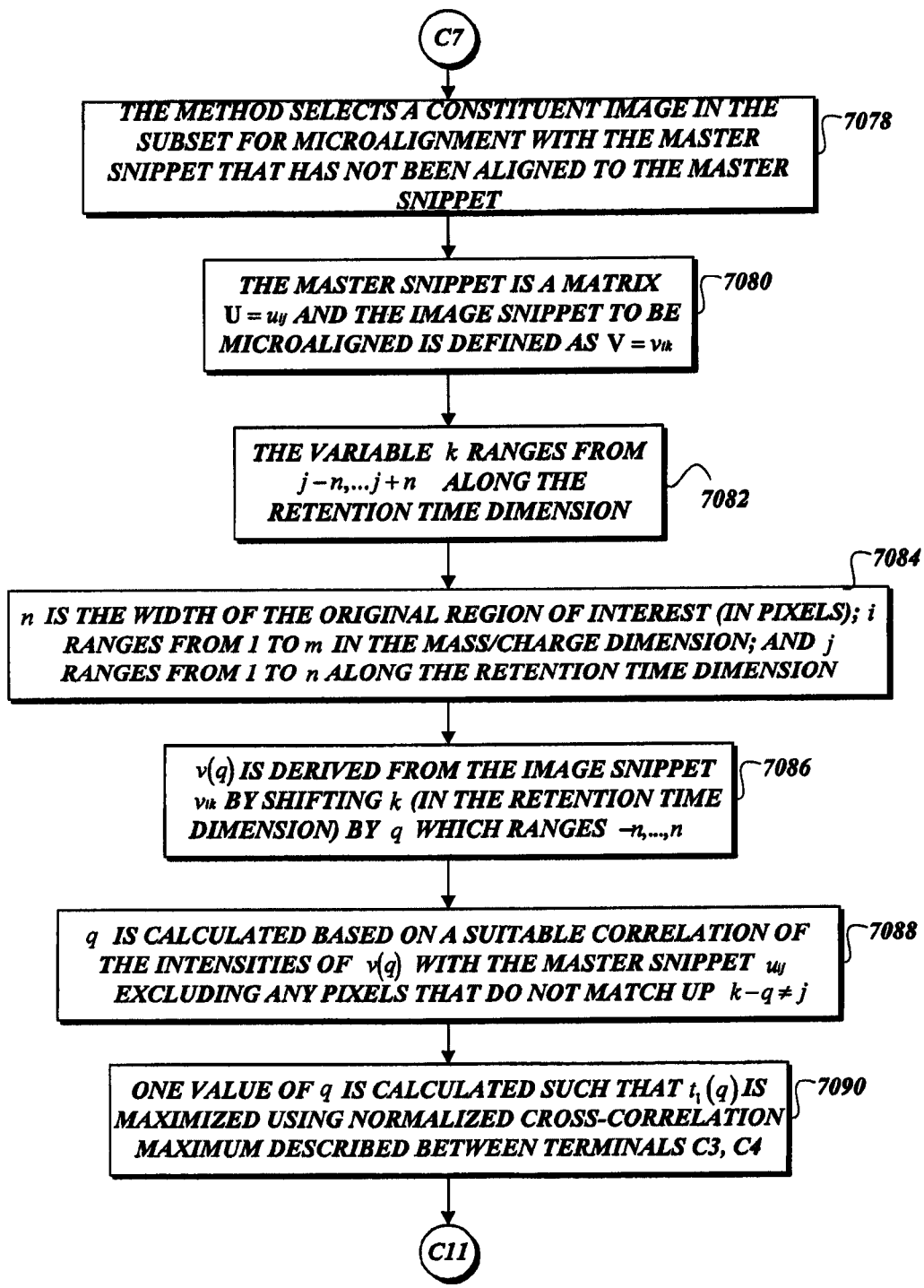
Figure 7I:
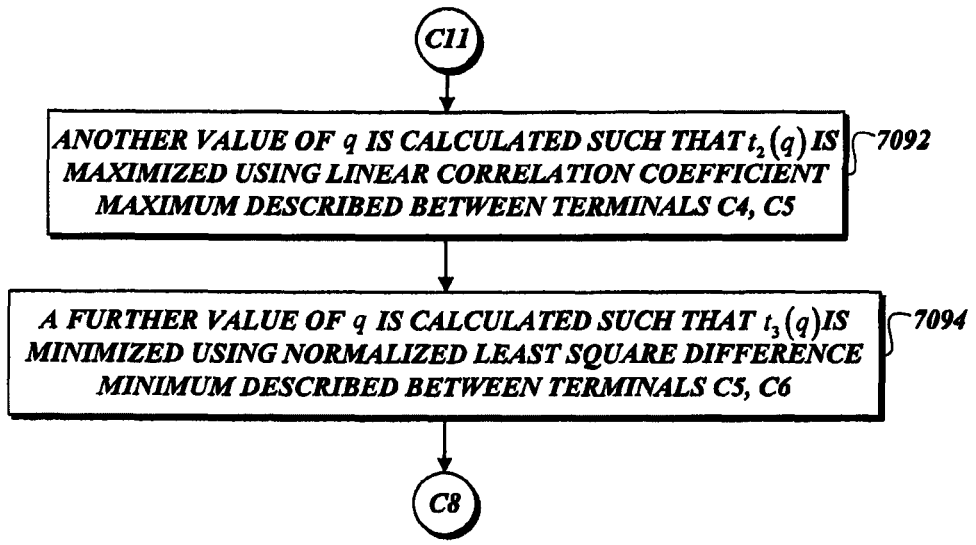
Figure 7J:
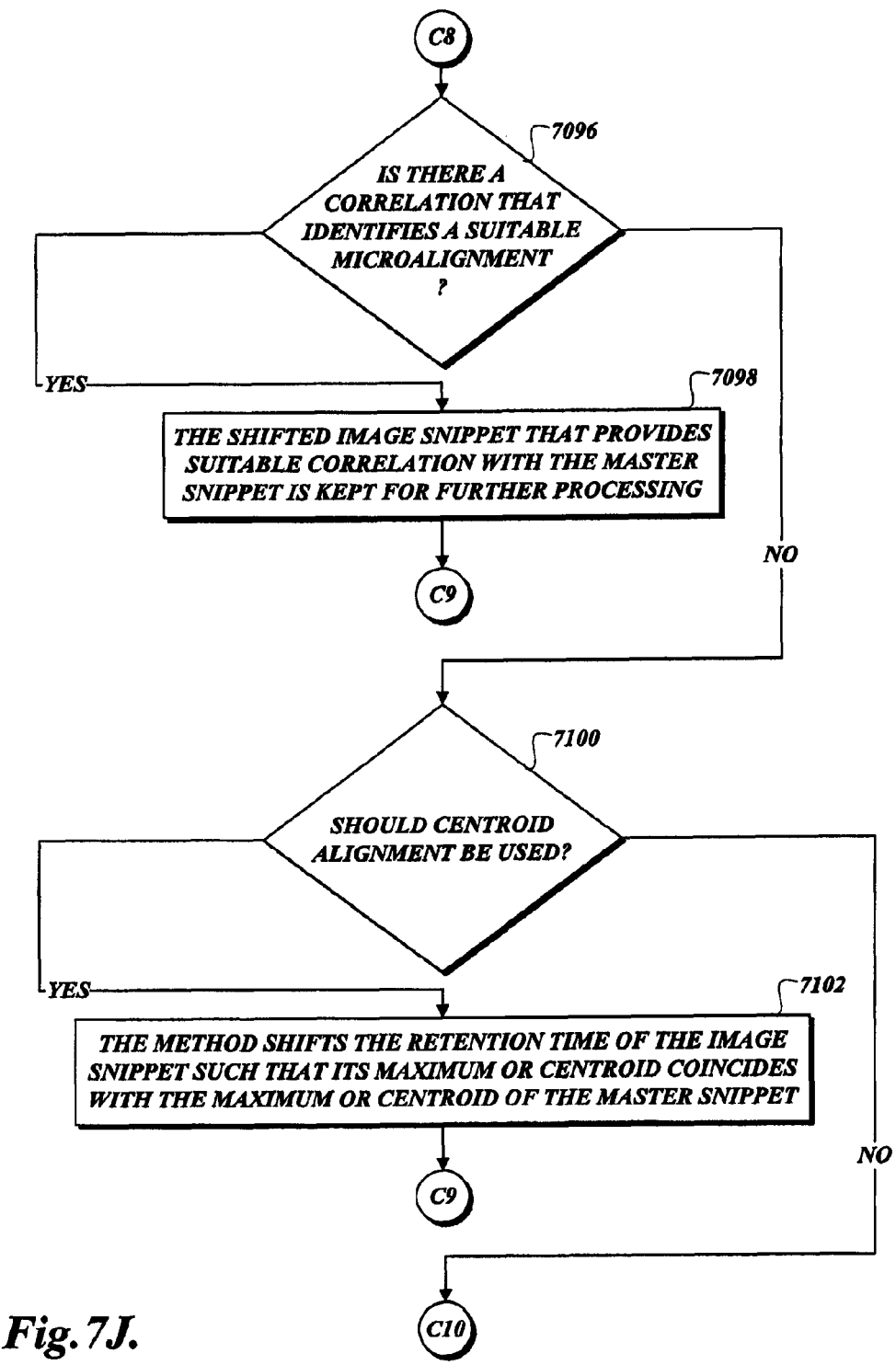
Figure 7K:
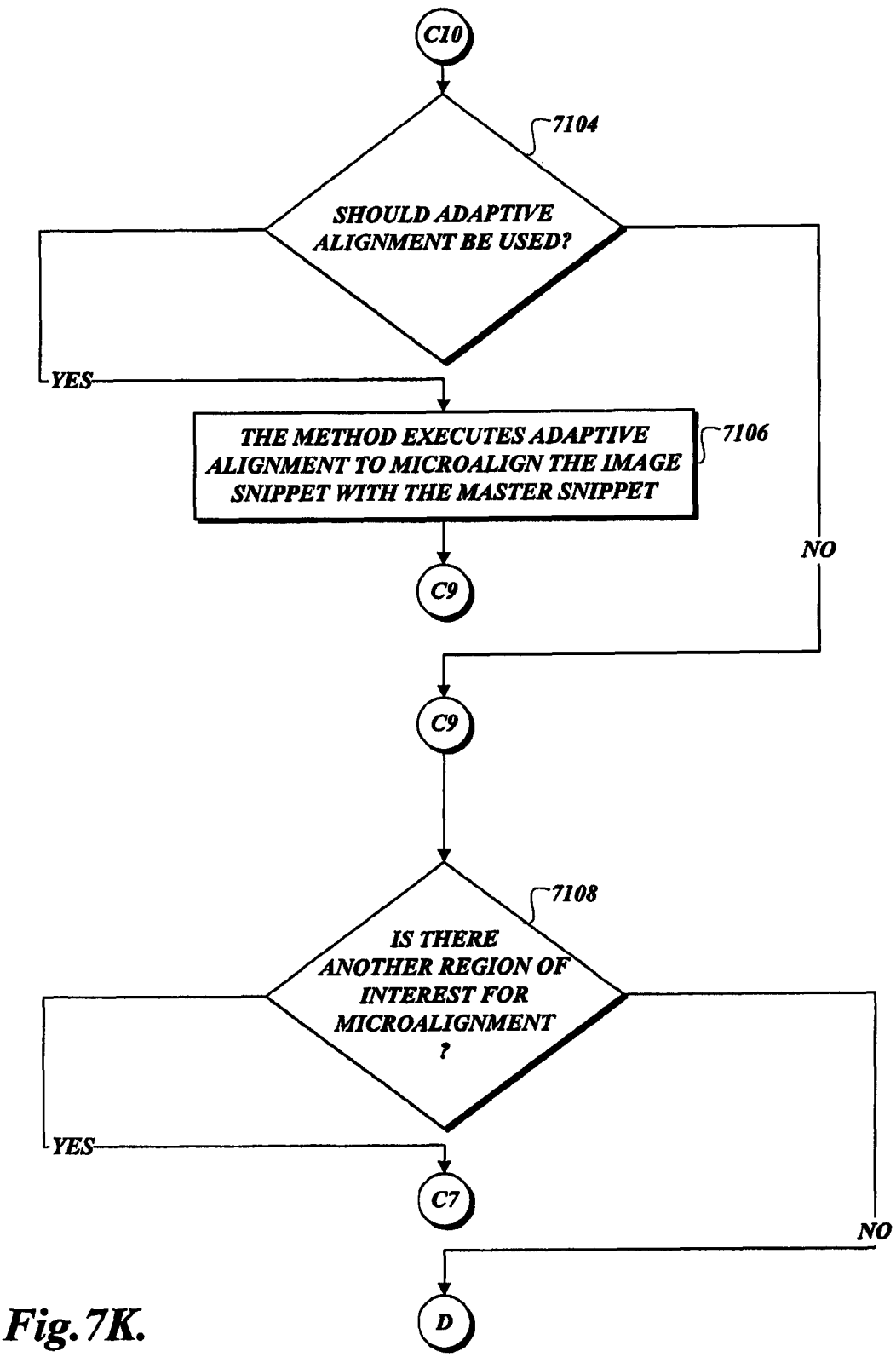
Figure 7L:
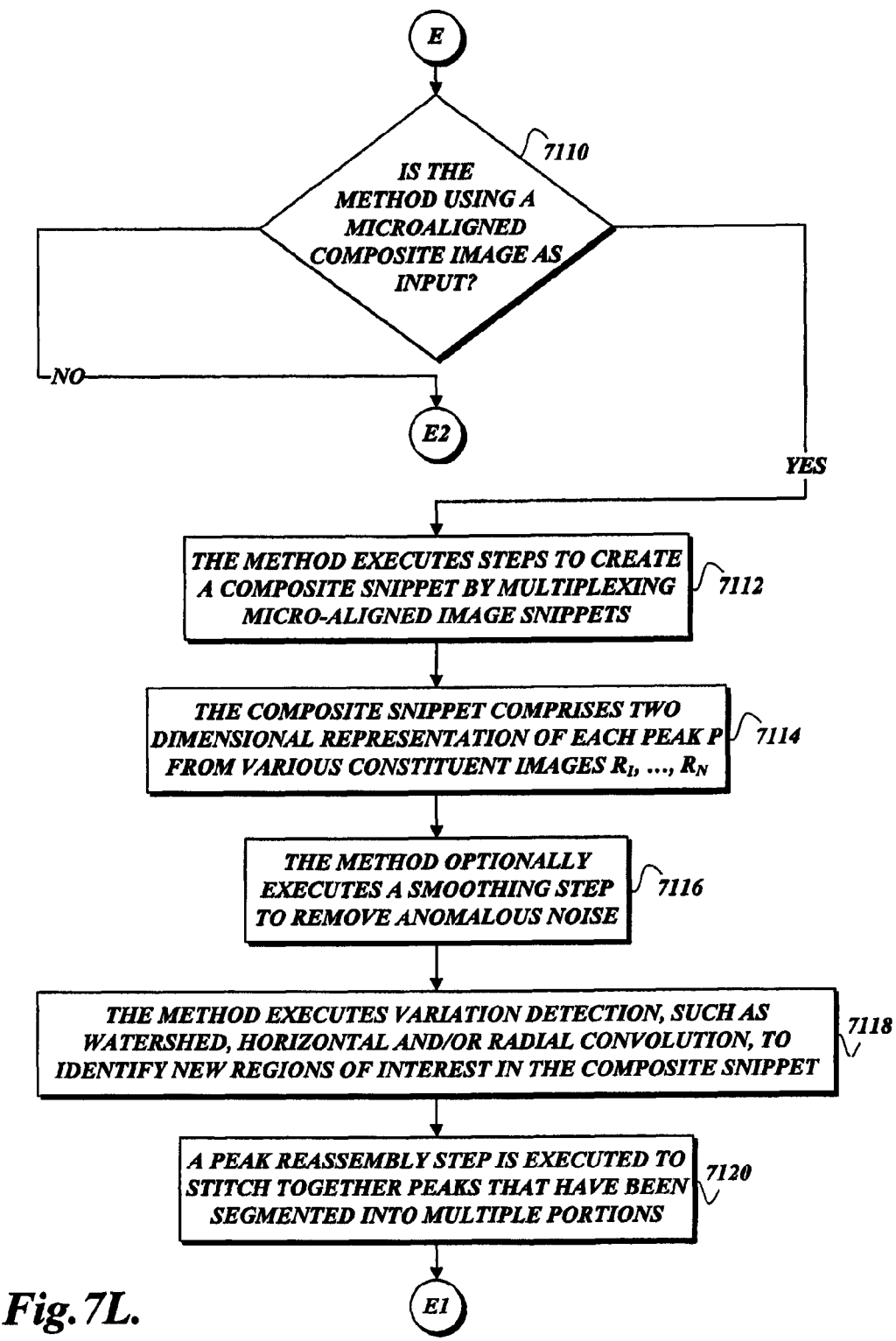
Figure 7M:
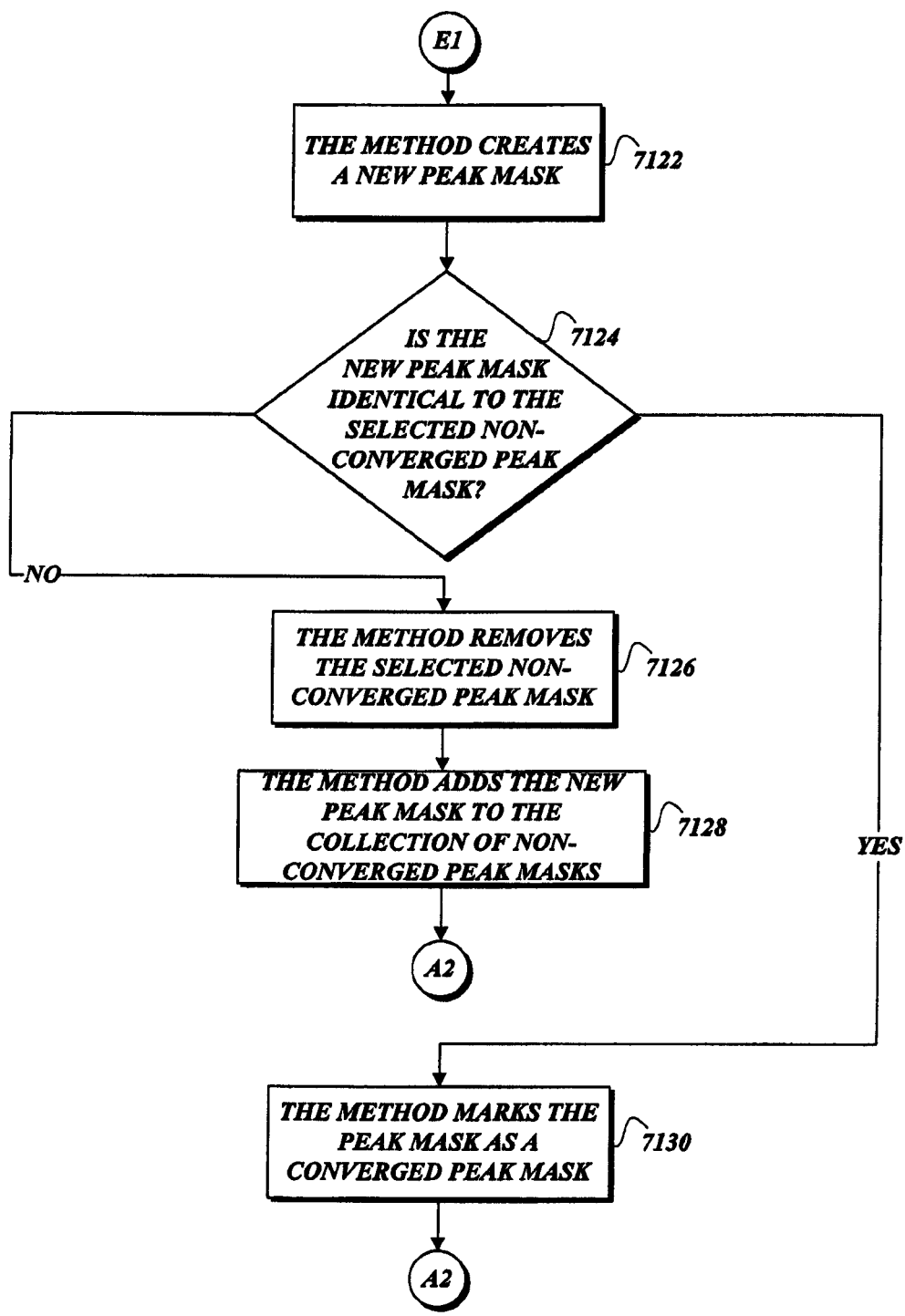
Figure 7N:
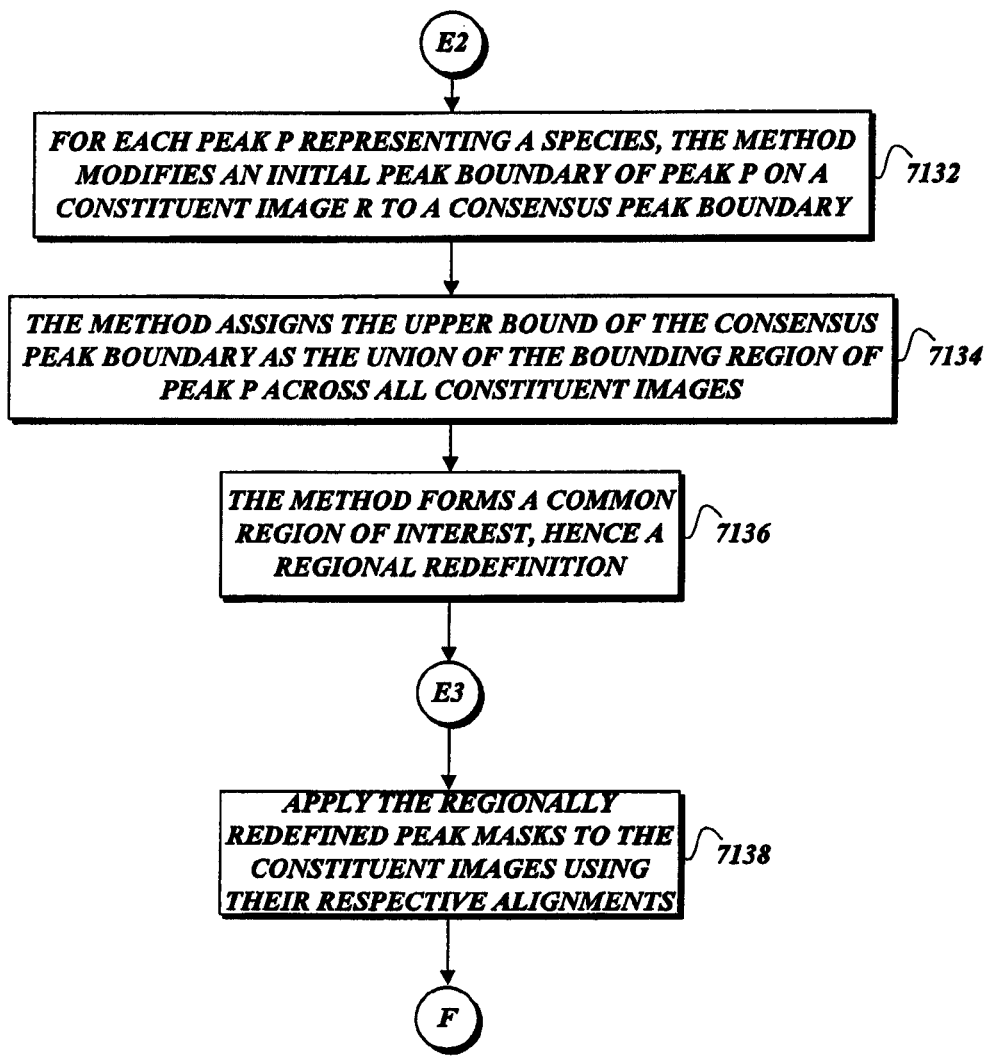

FIGS. 7A-7N illustrate a method 7000 for iteratively redefining regions of interest to discover biological features. From a start block, the method 7000 proceeds to a set of method steps 7002, defined between a continuation terminal ("terminal A") and an exit terminal ("terminal B"). The set of method steps 7002 describes the execution of a set of reconciliation steps from which data is derived from prepared biological samples. The reconciliation step associates peaks from different constituents. See FIGS. 7B-7D. Images of such constituents are exemplified in FIGS. 5A-5C. It can be assumed that these constituent images have been macroaligned, which macroalignment is imperfect due to residual local misalignment. Regarding the reconciliation process for a composite image as shown in FIG. 5D, image segmentation performed on a composite image produces a set of peaks as shown in FIG. 5E. In a desired result, a single chemical species is represented by one peak and each peak represents only one chemical species. However, over-segmentation or peak merging may occur. Over-segmentation may lead to multiple peaks that may in fact represent the same single species. Such over-segmented peaks need to be reassembled back into a single peak. A peak reassembler executing a peak reassembly process may suitably be used to reassemble an over-segmented peak. Conversely, mis-alignments among the constituents, as exemplified in FIGS. 5A-5C may cause merging of peaks on a composite image that point to different chemical species. This situation is exemplified in FIGS. 5E-5F, where a conglomeration of peaks, referred to as Spot 1 in FIG. 5F results from multiplexing FIGS. 5A-5C. In these cases, the separation of species is achieved through microalignment followed by a segmentation. Regarding the reconciliation process for a set of constituent images without the composite image, image segmentation is executed on each individual constituent image alone to create a list of peaks for each respective constituent image. The method then associates a peak on a constituent image with other peaks on other constituent images if they point to the same species.

From terminal A (FIG. 7B), the method 7000 proceeds to block 7008 to execute LC/MS processing to produce a set of LC/MS images (constituent images). At block 7010, the method optionally executes a macroalignment process, such as a time-warp algorithm, to align the set of constituent images. Such constituent images are pictorially exemplified in FIGS. 5A-5C. It can be assumed that these constituent images have been macroaligned, which macroalignment appears to be imperfect because residual localized misalignment remains. The method then proceeds to decision block 7012 where a test is performed to determine whether the method is using only constituent images as input for regional redefinition. If the answer to the test is No, the method proceeds to another continuation terminal ("terminal A1"). (In other words, the method selects to use a composite image instead of using its constituent images to determine peak masks.) Otherwise (in which case the method selects to use only constituent images instead of a composite image based on the constituent images), if the answer to the test is Yes, the method proceeds to block 7014 where the method 7000 identifies regions of interest in the constituent images by using peak detection to form a list of peaks for each constituent image. At block 7016, the method considers all peaks, such that a peak $P_1$ on a constituent image $R_1$ is associated with other peaks, identifying the same species P on the remaining constituent images $R_2, \ldots, R_N$. The method then enters exit terminal B.

From terminal A1 (FIG. 7C), a composite image is formed from the set of constituent images. See block 7018. Such a composite image is pictorially exemplified in FIG. 5D. The method 7000 then identifies regions of interest in this composite image by detecting variations in the composite image (such as peak detection). See block 7020. Peak detection results in peak masks that define the location and boundaries of peaks. FIG. 5E is a pictorial representation of example peak masks that could be derived from the composite image exemplified in FIG. 5D. At block 7022, the method creates a collection of peak masks. Initially, all peaks are considered to be not converged. Next, the method proceeds to another continuation terminal ("terminal A2"). From terminal A2, the method proceeds to decision block 7024 where a test is performed to determine whether all peak masks have converged. If the answer to the test at decision block 7024 is Yes, the method proceeds to another continuation terminal ("terminal E3") and terminates execution. Otherwise, if the answer to the test at decision block 7024 is No, and the method proceeds to block 7026 where the method selects a non-converged peak mask from the collection of peak masks. The method then enters another continuation terminal ("terminal A3").

Figure 5H:
FIGS. 5H-5J are pictorial diagrams illustrating exemplary snippets of various individual constituent images overlaid with the exemplary peak mask.
Figure 5I:
Figure 5J:

From terminal A3 (FIG. 7D), the method identifies the region of interest in the composite image that contains the peak mask selected in block 7026. This region of interest is termed the original region of interest. See block 7028. FIG. 5G exemplifies in pictorial form such an original region of interest. At block 7030, the method identifies regions of interest in the constituent images whose boundaries and locations relate to the original region of interest in the composite image. The region of interest on each constituent image is determined by the composite image and then projected in a cookie-cutter fashion onto the constituent images considering their respective macroalignments. FIGS. 5H-5J exemplify the respective regions of interest for each constituent that were identified using the exemplified original region of interest from FIG. 5O. The method measures the width of the original region of interest (in the retention time dimension) in the composite image. See block 7032. The method further expands the width of each identified region of interest backward and forward in the retention time dimension by the measured width resulting in a threefold increase. See block 7036. At block 7038, the method optionally reduces the height of each identified region of interest to focus on a chromatogram at a central mass/charge modified by a tolerance. In summary, the above steps describe the use of the non-converged composite peak mask to identify an image snippet within each constituent image, resulting in a collection of image snippets.

From terminal B (FIG. 7A), the method 7000 proceeds to a set of method steps 7004, defined between a continuation terminal ("terminal C") and an exit terminal ("terminal D"). The set of method steps 7004 executes a microalignment process that aligns regions of interest. From terminal C (FIG. 7E), the method 7000 proceeds to decision block 7042 where a test is performed to determine whether the master snippet is determined from among the constituents by alignment to the composite image. If the answer to the test at decision block 7042 is NO, the method 7000 proceeds to block 7044 where a suitable master snippet is selected from among the constituent and composite snippets by other means including a random choice. The method then continues to another continuation terminal ("terminal C7"). If, instead, the answer is YES to the test at decision block 7042, the method continues to another continuation terminal ("terminal C2").

From terminal C2 (FIG. 7E), the method 7000 proceeds to block 7046 where the method begins to find a region of interest (as the perspective master snippet) in the subset of constituent images that correlates with the original region of interest. At block 7048, the original region of interest is a matrix $U=u_{ij}$ and the prospective master snippet is defined as $V=v_{ik}$. The variable k has a range from j−n, ..., j+n, where n is the width of the original region of interest (in pixels). See block 7048. The variable i ranges from 1 to m in the mass/charge dimension. See block 7050. The variable j ranges from 1 to n along the retention time dimension. See block 7050. At block 7052, v(q) is a vector derived from the prospective master snippet. The variable q represents the retention time shift and it ranges from −n, ..., n. See block 7052. The method 7000 then continues to another continuation terminal ("terminal C3").

From terminal C3 (FIG. 7F), the method prepares to calculate normalized cross-correlation maximum $t_1(q)$. See block 7054. At block 7046, the method calculates the term $$\bar{u} = \frac{1}{mn}\sum_i^m \sum_j^n u_{ij}.$$

The term $\bar{u}$ is the result of the above mathematic operation. At block 7058, the method further calculates the following term $$\overline{v(q)} = \frac{1}{mn}\sum_i^m \sum_j^n v_i(j-q).$$

The resulting $\overline{v(q)}$ is the result of such a mathematical operation. The method 7000 proceeds to block 7060 where the method calculates $t_1(q)$ from the following expression:

$$t_1(q) = \frac{1}{(mn-1)^2}\sum_i^m \sum_j^n \frac{(u_{ij}-\bar{u})(v_i(j-q)-\overline{v(q)})}{\sqrt{\sum_i\sum_j(u_{ij}-\bar{u})^2}\sqrt{\sum_i\sum_j(v_i(j-q)-\overline{v(q)})^2}}.$$

The method 7000 continues to another continuation terminal ("terminal C4"). From terminal C4 (FIG. 7F), the method proceeds to block 7062 where the method prepares to calculate linear correlation coefficient maximum $t_2(q)$, which is a quotient of a dividend and a divisor. At block 7064, the dividend is calculated as follows:

$$mn\sum_i^m \sum_j^n u_{ij} v_i(j-q) - \sum_i^m \sum_j^n u_{ij} \sum_i^m \sum_j^n v_i(j-q)$$

At block 7066, the divisor is calculated as follows:

$$\sqrt{\left(mn\sum_i^m \sum_j^n u_{ij}^2 - \left(\sum_i^m \sum_j^n u_{ij}\right)^2\right)\left(mn\sum_i^m \sum_j^n v_i(j-q)^2 - \left(\sum_i^m \sum_j^n v_i(j-q)\right)^2\right)}$$

The method 7000 then continues to another continuation terminal ("terminal C5"). From terminal C5 (FIG. 7G), the method prepares to calculate normalized least-square difference minimum $t_3(q)$. See block 7068. The method calculates the following expression:

$$t_3(q) = \sum_i \left(\frac{\sum_j v_i(j-q)}{\sum_i \sum_j v_i(j-q)} - \frac{\sum_j u_{ij}}{\sum_i \sum_j u_{ij}}\right)^2$$

See block 7070. The method then continues to another continuation terminal ("terminal C6"). From terminal C6 (FIG. 7G), the method proceeds to block 7072 where a score for the region of interest is selected among normalized cross-correlation maximum, linear correlation coefficient maximum, and normalized least-square difference minimum. The method 7000 proceeds to decision block 7074 wherein a test is performed to determine whether all constituents were evaluated for this region of interest. If the answer to the test at decision block 7074 is NO, the method proceeds to terminal C2 and loops back to block 7046 where the above-identified processing steps are repeated. Otherwise, if the answer to the test at decision block 7074 is YES, then the method proceeds to block 7076 where the region of interest with a score that best correlates with the original region of interest in a composite image is selected as the master snippet for micro-alignment. The method then continues to another continuation terminal ("terminal C7").

From terminal C7 (FIG. 7H), the method selects a region of interest (an image snippet) in a constituent image in the subset for micro-alignment with the master snippet. See block 7078. The master snippet is a matrix $U=u_{ij}$ and the image snippet to be micro-aligned is defined as $V=v_{ik}$. See block 7080. Furthermore, n is the width of the original region of interest (in pixels) and i ranges from 1 to m in the mass/charge dimension, and j ranges from 1 to n along the retention time dimension, and k ranges from j−n to j+n along the retention time dimension. See blocks 7082, 7084. v(q) is derived from the image snippet $v_{ik}$ by shifting k (in the retention time dimension) by q, which ranges −m, ..., n. See block 7086. q is calculated based on a suitable correlation of the intensity of v(q) with the master snippet $u_{ij}$ excluding any pixels that do not match up because k−q≠j. See block 7088. Various strategies to time alignment may be used. What follows are some example strategies. One value of q is calculated such that $t_1(q)$ is maximized using the normalized cross-correlation maximum described between terminals C3, C4. See block 7090. The method 7000 proceeds to another continuation terminal ("terminal C11").

From terminal C11 (FIG. 7I), another value of q is calculated such that $t_2(q)$ is maximized using the linear correlation coefficient maximum described between terminals C4, C5. See block 7092. A further value of q is calculated such that $t_3(q)$ is minimized using the normalized least-square difference minimum described between terminals C5, C6. See block 7094. The method 7000 then proceeds to another continuation terminal ("terminal C8"). From terminal C8 (FIG. 7J), the method proceeds to decision block 7096 where a test is performed to determine whether there is a correlation that identifies a suitable microalignment. If the answer to the test at decision block 7096 is YES, the shifted image snippet that provides a suitable correlation with the master snippet is kept for further processing. See block 7098. The method then continues to another continuation terminal ("terminal C9"). If the answer to the test at decision block 7096 is NO, the method continues to another decision block 7100 where a test is performed to determine whether centroid alignment should be used. If the answer to the test at decision block 7100 is YES, the method shifts the retention time of the image snippet such that its maximum or centroid coincides with the maximum or centroid of the master snippet. See block 7102. The method then continues to terminal C9. If the answer to the test at decision block 7100 is NO, the method continues to another continuation terminal ("terminal C10").

From terminal C10 (FIG. 7K), the method proceeds to decision block 7104 where a test is performed to determine whether another method of alignment should be used, such as adaptive alignment. If the answer to the test at decision block 7104 is YES, the method executes the other form of alignment to micro-align the image snippet with the master snippet. See block 7106. The method then continues to terminal C9. If the answer to the test at decision block 7104 is NO, the method continues to terminal C9 and further proceeds to decision block 7108 where a test is performed to determine whether there is another region of interest for micro-alignment. If the answer to the test at decision block 7108 is YES, then the method proceeds to terminal C7 and loops back to block 7082 where the above-identified processing steps are repeated. Otherwise, if the answer to the test at decision block 7108 is NO, then the method continues to exit terminal D. FIGS. 5K-5M are pictorial examples of the microaligned regions of interest given the image snippets exemplified in FIGS. 5H-5J.

From terminal D (FIG. 7A), the method 7000 proceeds to a set of method steps 7006 defined between a continuation terminal ("terminal E") and an exit terminal ("terminal F"). The set of method steps 7006 executes a regional redefinition process to focus on a boundary area that captures a better signal-to-noise ratio and is suitable for a subsequent scoring process and scientific evaluation. From terminal E (FIG. 7L), the method proceeds to decision block 7110 where a test is performed to determine whether the method is using a microaligned composite image as input. If the answer to the test at decision block 7110 is NO, the method proceeds to a continuation terminal ("terminal E2"). Otherwise, if the answer to the test at decision block 7110 is YES, then the method executes steps to create a composite snippet (different from the original region of interest in the composite image). See block 7112. FIGS. 5K-5M are pictorial examples of the microaligned regions of interest that resulted from the microaligned process of method steps 7004. FIG. 5N is a pictorial example of the composite snippet derived from these microaligned regions of interest.

At block 7114, the composite snippet comprises a two-dimensional representation of each peak P from various constituent images $R_1, \ldots, R_N$. The method optionally executes a smoothing step to remove anomalous noise. See block 7116. At block 7118, the method executes variation detection (peak detection), such as thresholding, watershed, horizontal and/or radial edge detection by a Laplace of Gaussian convolution, to identify new peak masks in the composite snippets. A peak reassembly step is executed to stitch together peaks that may have been incorrectly segmented into multiple portions. See block 7120. The method then enters into another continuation terminal ("terminal E1").

From terminal E1 (FIG. 7M), the method creates a new peak mask from the microaligned composite snippet. See block 7122. FIG. 5P exemplifies the new peak masks that were derived from FIG. 5O by peak detection. The method proceeds to decision block 7124 where a test is performed to determine whether the new peak mask is identical to the non-converged peak mask that was selected in block 7026. If the answer to the test at decision block 7124 is NO, the method removes the selected non-converged peak mask. See block 7126. The method then proceeds to block 7128 where the method adds the new peak masks from the micro-aligned composite snippet to the collection of non-converged peak masks. In the example of FIG. 5, the two peak masks, shown both in FIG. 5P and FIG. 5Q, differ from the initial microaligned composite peak mask, that is the lower spot in FIG. 5E. In this example, the peak mask that represents the lower spot in FIG. 5E would be removed from the non-converged collection of peak masks, but would not be marked as converged. The two new peak masks, shown both in FIG. 5P and FIG. 5Q, would be added to the non-converged collection. The method then proceeds to terminal A2 and skips back to decision block 7024 where the above identified processing steps are repeated. Otherwise, if the answer to the test at decision block 7124 is YES, the method proceeds to block 7130 where the method marks the peak mask as a converged peak mask. The method then proceeds to terminal A2 and skips back to decision block 7024 where the above identified processing steps are repeated. Given the pictorial example of FIG. 5, the two peak masks shown in FIG. 5P will be resolved into the three peak masks, shown both in FIG. 5R and FIG. 5S, by the same processes that produced the two peak masks shown in FIG. 5P from FIG. 5E.

From terminal E2 (FIG. 7N), the method proceeds to block 7132. For each peak P representing a species, the method modifies an initial peak boundary of peak P on a constituent image R to a consensus peak boundary. At block 7134, the method assigns the larger bound of the consensus peak boundary as the union of the bounding region of peak P across all constituent images. At block 7136, the method forms a common region of interest, hence a regional redefinition. This process is shown in pictorial form in FIGS. 6J-6K. The method proceeds through terminal E3 to block 7138, where the regionally redefined peak masks are applied to the constituent images using their respective alignments. FIGS. 5T-5V and FIGS. 6L-6Q depict the results of the iterative processing for the example in FIG. 5 and FIG. 6, respectively. The method then continues to terminal F and terminates execution.

Figure 8:
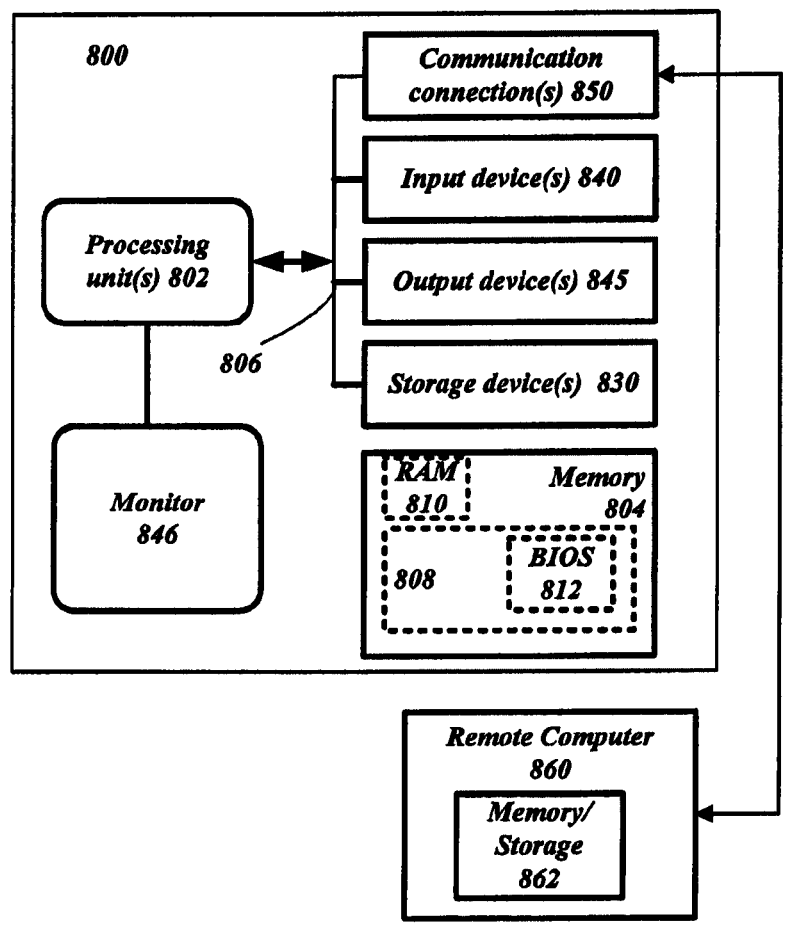
FIG. 8 is a block diagram illustrating a representative computing environment suitable for implementation of the disclosed methods.

FIG. 8 and the following discussion are intended to provide a brief, general description of an exemplary computing environment in which the disclosed technology may be implemented. Although not required, the disclosed technology is described in the general context of computer-executable instructions, such as program modules, being executed by a personal computer (PC). Generally, program modules include routines, programs, objects, components, data structures, etc., that perform particular tasks or implement particular abstract data types. Moreover, the disclosed technology may be implemented with other computer system configurations, including hand-held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices. With reference to FIG. 8, an exemplary system for implementing the disclosed technology includes a general purpose computing device in the form of an exemplary conventional PC 800, including one or more processing units 802, a system memory 804, and a system bus 806 that couples various system components including the system memory 804 to the one or more processing units 802. The system bus 806 may be any of several types of bus structures including a memory bus or memory controller, a peripheral bus, and a local bus using any of a variety of bus architectures. The exemplary system memory 804 includes read only memory (ROM) 808 and random access memory (RAM) 810. A basic input/output system (BIOS) 812, containing the basic routines that help with the transfer of information between elements within the PC 800, is stored in ROM 808.

The exemplary PC 800 further includes one or more storage devices 830 such as a hard disk drive for reading from and writing to a hard disk, a magnetic disk drive for reading from or writing to a removable magnetic disk, and an optical disk drive for reading from or writing to a removable optical disk (such as a CD-ROM or other optical media). Such storage devices can be connected to the system bus 806 by a hard disk drive interface, a magnetic disk drive interface, and an optical drive interface, respectively. The drives and their associated computer-readable media provide nonvolatile storage of computer-readable instructions, data structures, program modules, and other data for the PC 800. Other types of computer-readable media which can store data that is accessible by a PC, such as magnetic cassettes, flash memory cards, digital video disks, CDs, DVDs, RAMs, ROMs, and the like, may also be used in the exemplary operating environment.

A number of program modules may be stored in the storage devices 830 including an operating system, one or more application programs, other program modules, and program data. A user may enter commands and information into the PC 800 through one or more input devices 840 such as a keyboard and a pointing device such as a mouse. Other input devices may include a digital camera, microphone, joystick, game pad, satellite dish, scanner, or the like. These and other input devices are often connected to the one or more processing units 802 through a serial port interface that is coupled to the system bus 806, but may be connected by other interfaces such as a parallel port, game port, or universal serial bus (USB). A monitor 846 or other type of display device is also connected to the system bus 806 via an interface, such as a video adapter. Other peripheral output devices, such as speakers and printers (not shown), may be included.

The PC 800 may operate in a networked environment using logical connections to one or more remote computers, such as a remote computer 860. In some examples, one or more network or communication connections 850 are included. The remote computer 860 may be another PC, a server, a router, a network PC, or a peer device or other common network node, and typically includes many or all of the elements described above relative to the PC 800, although only a memory storage device 862 has been illustrated in FIG. 8. The personal computer 800 and/or the remote computer 860 can be connected to a logical a local area network (LAN) and a wide area network (WAN). Such networking environments are commonplace in offices, enterprise-wide computer networks, intranets, and the Internet.

When used in a LAN networking environment, the PC 800 is connected to the LAN through a network interface. When used in a WAN networking environment, the PC 800 typically includes a modem or other means for establishing communications over the WAN, such as the Internet. In a networked environment, program modules depicted relative to the personal computer 800, or portions thereof, may be stored in the remote memory storage device or other locations on the LAN or WAN. The network connections shown are exemplary, and other means of establishing a communications link between the computers may be used. Having described and illustrated the principles of our invention with reference to the illustrated embodiments, it will be recognized that the illustrated embodiments can be modified in arrangement and detail without departing from such principles. For instance, elements of the illustrated embodiment shown in software may be implemented in hardware and vice-versa. Also, the technologies from any example can be combined with the technologies described in any one or more of the other examples. In view of the many possible embodiments to which the principles of the invention may be applied, it should be recognized that the illustrated embodiments are examples of the invention and should not be taken as a limitation on the scope of the invention. For instance, various components of systems and tools described herein may be combined in function and use. We therefore claim as our invention all subject matter that comes within the scope and spirit of these claims. Alternatives specifically addressed in these sections are merely exemplary and do not constitute all possible alternatives to the embodiments described herein. While illustrative embodiments have been illustrated and described, it will be appreciated that various changes can be made therein without departing from the spirit and scope of the invention.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. An iterative regional processor comprising:
   hardware configured to execute:
   a data selector configured to receive a set of at least two constituent images, to select portions of the at least two constituent images that contain bounding areas localizing peaks of the constituent images, and to identify bounding areas for peaks associated with a common species across the set of constituent images and associated with a selected region of interest; and
   a regional redefiner configured to alter the identified bounding areas that are associated with the common species in the set of constituent images based on a composite snippet formed from the selected portions of the set of constituent images, wherein the composite snippet captures the peaks associated with the common species in the selected portions of the set of constituent images.

2. The processor of claim 1, wherein the hardware is further configured to execute a microaligner configured to align a region of interest that contains a peak associated with the common species in one of the portions with a corresponding region of interest in a different one of the portions that contains another peak associated with the common species.

3. The processor of claim 1, wherein the hardware is further configured to execute a reconciliator configured to provide an identification of regions of interest associated with the common species.

4. The processor of claim 3, wherein the reconciliator includes a peak reassembler that executes a peak reassembly process, wherein the selecting of the portions by the data selector is based on the peak reassembly process.

5. The processor of claim 1, wherein the data selector receives a composite image and selects the portions of the constituent images as a portion of the composite image.

6. The processor of claim 1, wherein the data selector receives of the constituent images individually.

7. The processor of claim 1, wherein the constituent images are chromatography/mass spectroscopy images.

8. A method of regional redefinition, comprising:
by a computer, defining at least one region of interest associated with a set of at least two constituent images;
defining bounding areas localizing peaks within the at least two constituent images, wherein the defined bounding areas are based on the at least one region of interest;
identifying bounding areas for peaks associated with a common species across the set of constituent images and associated with a selected region of interest; and
redefining the selected region of interest based on the set of constituent images or a composite image associated with the set of constituent images so as to alter at least one of the identified bounding areas, wherein the altering of the at least one of the identified bounding areas is based on a composite snippet of a composite image, wherein the composite snippet captures peaks associated with the common species in the set of constituent images.

9. The method of claim 8, further comprising aligning only portions of at least two constituent images selected from the set of constituent images, wherein the portions of the constituent images are associated with respective regions of interest.

10. The method of claim 8, further comprising identifying at least one common species associated with the set of constituent images based upon a segmentation of the composite image.

11. The method of claim 8, further comprising identifying at least one common species associated with the set of constituent images based on individual constituent images.

12. The method of claim 8, further comprising segmenting the composite snippet and identifying segmented peaks based on the composite snippet.

13. The method of claim 8, wherein the altering of the at least one of the identified bounding areas is based on a consensus peak boundary.

14. A computer-readable storage device having computer-executable instructions stored thereon for implementing a method for selecting analytical regions of interest, the method comprising:
selecting a composite image or a set of constituent images that includes at least two constituent images;
identifying at least one region of interest within the selected images;
defining bounding areas that localize peaks within the at least one region of interest; and
redefining a selected region of interest associated with at least one of the composite image or at least one of the constituent images of the set of constituent images so as to alter at least one bounding area corresponding to the selected region of interest for peaks that point to a common species across the constituent images of the set of constituent images, wherein redefining includes altering the at least one bounding area by forming a composite snippet that includes peaks associated with the common species across the set of constituent images.

15. The computer-readable storage device of claim 14, wherein the method further comprises aligning only regions of interest of at least two constituent images in the set of constituent images.

16. The computer-readable storage device of claim 14, wherein the method further comprises identifying at least one common species associated with the set of constituent images based upon a segmentation of the composite image.

17. The computer-readable storage device of claim 14, wherein the method further comprises identifying at least one common species associated with the set of constituent images based on the constituent images.

18. The computer-readable storage device of claim 14, wherein the method further comprises segmenting the composite snippet and identifying the common species based on stitching together segmented peaks that have been segmented.

19. The computer-readable storage device of claim 14, wherein redefining includes altering the at least one bounding area by forming a consensus peak boundary.

20. The computer-readable storage device of claim 14 claim, wherein the constituent images are chromatography/mass spectroscopic images.

* * * * *